US009338768B2

(12) United States Patent
Han et al.

(10) Patent No.: US 9,338,768 B2
(45) Date of Patent: May 10, 2016

(54) UPLINK POWER CONTROL FOR PHYSICAL UPLINK CONTROL CHANNEL

(71) Applicant: Intel Corporation, Santa Clara, CA (US)

(72) Inventors: Seunghee Han, Seoul (KR); Hong He, Beijing (CN); Shafi Bashar, Santa Clara, CA (US); Jong-Kae Fwu, Sunnyvale, CA (US); Xiaogang Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 13/953,506

(22) Filed: Jul. 29, 2013

(65) Prior Publication Data
US 2014/0029532 A1 Jan. 30, 2014

Related U.S. Application Data

(60) Provisional application No. 61/676,775, filed on Jul. 27, 2012, provisional application No. 61/679,627, filed on Aug. 3, 2012.

(51) Int. Cl.
H04W 72/04 (2009.01)
H04L 1/18 (2006.01)
H04W 52/14 (2009.01)
H04L 1/16 (2006.01)
H04L 5/00 (2006.01)
H04L 1/00 (2006.01)

(52) U.S. Cl.
CPC ......... *H04W 72/0413* (2013.01); *H04L 1/1671* (2013.01); *H04L 1/18* (2013.01); *H04L 1/1861* (2013.01); *H04W 52/146* (2013.01); *H04L 1/0026* (2013.01); *H04L 5/0055* (2013.01); *H04L 5/0057* (2013.01)

(58) Field of Classification Search
None
See application file for complete search history.

(56) References Cited

U.S. PATENT DOCUMENTS

| 2011/0141928 | A1 | 6/2011 | Shin et al. | |
|---|---|---|---|---|
| 2011/0249578 | A1 | 10/2011 | Nayeb Nazar et al. | |
| 2011/0274043 | A1 | 11/2011 | Nam et al. | |
| 2012/0113907 | A1* | 5/2012 | Baldemair et al. | 370/329 |
| 2012/0207047 | A1 | 8/2012 | Liao et al. | |
| 2013/0208665 | A1* | 8/2013 | Baldemair et al. | 370/329 |
| 2013/0301550 | A1* | 11/2013 | Kim et al. | 370/329 |

OTHER PUBLICATIONS

3GPP, "Technical Specification Group Radio Access Network; Evolved Universal Terrestrial Radio Access (E-UTRA); Physical layer procedures (Release 10)," 3GPP TS 36.213 V10.6.0, Jun. 26, 2012, Lte Advanced, Section 5 and 10, 125 pages.
3GPP, "Technical Specification Group Radio Access Network; Evolved Universal Terrestrial Radio Access (E-UTRA); Multiplexing and channel coding (Release 10)," 3GPP TS 36.212 V10.6.0, Jun. 26, 2012, Section 5, 79 pages.

(Continued)

*Primary Examiner* — Habte Mered
(74) *Attorney, Agent, or Firm* — Schwabe, Williamson & Wyatt, P.C.

(57) ABSTRACT

Embodiments of the present disclosure describe devices, methods, computer-readable media and systems configurations for uplink transmit power control for transmitting periodic channel state information. Other embodiments may be described and claimed.

18 Claims, 16 Drawing Sheets

(56) References Cited

OTHER PUBLICATIONS

3GPP, "Technical Specification Group Radio Access Network; Evolved Universal Terrestrial Radio Access (E-UTRA); Physical Channels and Modulation (Release 10)," 3GPP TS 36.211 V10.5.0, Jun. 26, 2012, Table 5A-1, Section 5.4, 101 pages.

International Search Report and Written Opinion mailed Nov. 28, 2013 from International Application No. PCT/US2013/053660.

3GPP, "Technical Specification Group Radio Access Network; Evolved Universal Terrestrial Radio Access (E-UTRA); Physical layer procedures (Release 10)," 3GPP TS 36.213 V10.6.0 (Jun. 2012), Lte Advanced, 126 pages.

Interdigital Communications, LLC, "Multi cell an and single cell P-CSI multiplexing with PUCCH F3," 3GPP TSG-RAN WG1 Meeting #69, R1-122543, May 21-25, 2012, Prague, Czech Republic, 5 pages.

Extended European Search Report issued Mar. 9, 2016 from European Patent Application No. 13824976.8, 11 pages.

ETSI, "LTE; Evolved Universal Terrestrial Radio Access (E-UTRA); Physical layer procedures (3GPP TS 36.213 version 10.6.0, Release 10)," ETSI TS 136 213 V10.6.0 (Jul. 2012), 3GPP TS 36.213 V10.6.0, Jan. 1, 2012, 127 pages.

Intel Corporation, "Multi-cell periodic CSI multiplexing," 3GPP TSG-RAN WG1 Meeting #70, R1-123159, Agenda Item: 7.2.1.1, Aug. 13-17, 2012, Qingdao, China, 12 pages.

Erik Dahlman et al., "Uplink Physical-Layer Processing (Chapter 11)," in: "4G LTE/LTE-Advanced for Mobile Broadband", Mar. 21, 2011 Elsevier, pp. 203-246.

Qualcomm Incorporated, "On reducing periodic CSI dropping for CA operation," 3GPP TSG RAN WG1 #69, R1-122762, Agenda item: 7.2.1.2.1, May 21-25, 2012, Prague, Czech Republic, 8 pages.

Hitachi Ltd., "Discussion on CSI feedback modes for CoMP," 3GPP TSG-RAN WG1 #69, R1-122984, Agenda Item: 7.5.1.4, May 21-25, 2012, Prague, Czech Republic, 5 pages.

* cited by examiner

UPLINK POWER CONTROL FOR PHYSICAL UPLINK CONTROL CHANNEL

CROSS REFERENCE TO RELATED APPLICATIONS

The present application claims priority to U.S. Provisional Patent Application No. 61/676,775, filed Jul. 27, 2012, entitled "ADVANCED WIRELESS COMMUNICATION SYSTEMS AND TECHNIQUES," and to U.S. Provisional Patent Application No. 61/679,627, filed Aug. 3, 2012, entitled "ADVANCED WIRELESS COMMUNICATION SYSTEMS AND TECHNIQUES," the entire disclosures of which are hereby incorporated by reference.

FIELD

Embodiments of the present invention relate generally to the field of wireless communications, and more particularly, to uplink power control for physical uplink control channel.

BACKGROUND

A physical uplink control channel (PUCCH) format 2 may convey two to four channel state information (CSI) bits to the eNB. In carrier aggregation, a CSI configuration of each serving cell may be independently configured by radio resource control (RRC) layers to have a particular periodicity, starting offset, PUCCH mode, etc. However, the transmission of CSI using PUCCH format 2 is done in primary cell only. When more than one CSI reporting for multiple serving cells collide with each other in the same subframe, only CSI for one serving cell may be transmitted and the others dropped. Further, when any CSI transmission using PUCCH format 2 and hybrid automatic repeat request-acknowledgement (HARQ-ACK) transmission using PUCCH format 2 in carrier aggregation collide in the same subframe, HARQ-ACK using PUCCH format 3 is transmitted and all CSIs are dropped. Frequent dropping of CSIs may decrease operational efficiencies of a network.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for uplink (UL) power control for physical uplink control channel (PUCCH). Some embodiments provide UL power control for transmitting uplink control information using PUCCH format 3. The UCI may include multi-cell periodic channel state information (p-CSI) or hybrid automatic repeat request-acknowledgment (HARQ-ACK) information multiplexed with one-cell p-CSI transmission. Transmitting the UCI with proper power control may enhance downlink throughput while reducing a dropping loss of CSI or HARQ-ACK information.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrase "A and/or B" means (A), (B), or (A and B). The phrases "A/B" and "A or B" mean (A), (B), or (A and B), similar to the phrase "A and/or B."

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

Figure 1:
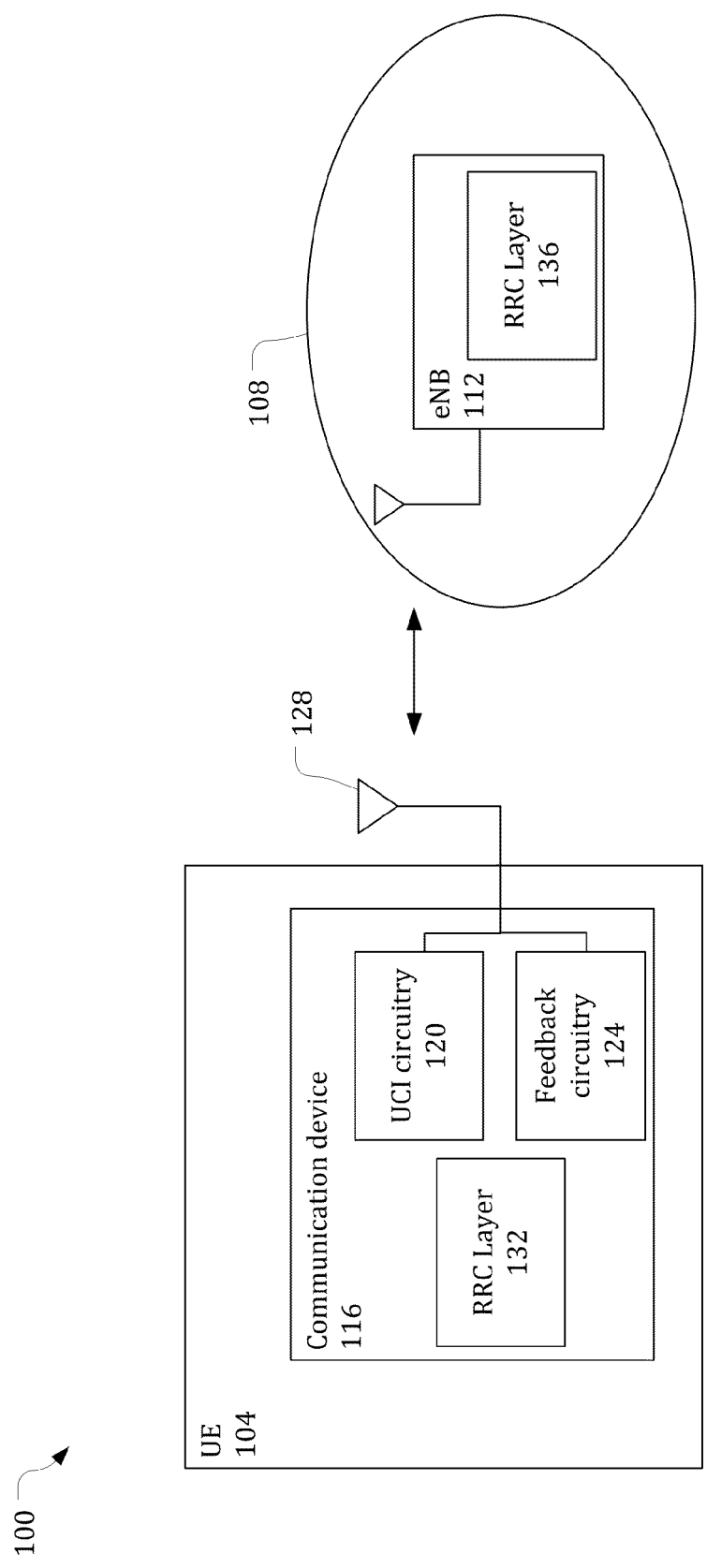
FIG. 1 schematically illustrates a network environment in accordance with various embodiments.

FIG. 1 schematically illustrates a network environment 100 in accordance with various embodiments. The network environment 100 includes a user equipment (UE) 104 wirelessly coupled with a radio access network (RAN) 108. The RAN 108 may include an enhanced node base station (eNB) 112 configured to communicate with the UE 104 via an over-the-air (OTA) interface. The RAN 108 may be part of a 3GPP LTE Advanced (LTE-A) network and may be referred to as an evolved universal terrestrial radio access network (EU-TRAN). In other embodiments, other radio access network technologies may be utilized.

The UE 104 may include a communication device 116 that implements various communication protocols in order to effectuate communication with the RAN 108. The communication device 116 may be a chip, chipset, or other collection of programmed and/or preconfigured circuitry. In some embodiments, the communication device 116 may include or be part of baseband circuitry, a radio transceiver circuitry, etc.

The communication device 116 may include uplink control information (UCI) circuitry 120 and feedback circuitry 124 coupled with each other and further coupled with one or more antennas 128.

The UCI circuitry 120 may implement various feedback processes such as, but not limited to, HARQ-ACK processes and CSI processes. For example, in some embodiments, the UCI circuitry 120 may determine whether downlink data was correctly received on a physical downlink shared channel (PDSCH) and generate acknowledgement information that includes acknowledgement/negative acknowledgement (ACK/NACK) bits (which may also be referred to as HARQ-ACK bits) to indicate whether codewords or transport blocks (TBs) of a downlink transmission were successfully received. In some embodiments, the UCI circuitry 120 may generate one ACK/NACK bit for a single codeword downlink transmission and two ACK/NACK bits for a two-codeword downlink transmission. In some embodiments, the HARQ-ACK processes may be in accordance with relevant technical specifications, for example, 3GPP Technical Specification (TS) 36.213 V10.6.0 (26 Jun. 2012).

The UCI circuitry 120 may also control generation and transmission of various CSI components that relate to channel state. The CSI components could include, but are not limited to, channel quality indicator (CQI), precoding matrix indicator (PMI), rank indicator (RI), and precoding type indicator (PTI). In some embodiments, the CSI feedback may be in accordance with relevant technical specifications, for example, 3GPP TS 36.213.

In some embodiments, the UE 104 may be semi-statically configured by higher layers, for example, a radio resource control (RRC) layers, to periodically feedback the various CSI components on a physical uplink control channel (PUCCH). The UE 104 may include an RRC layer 132 that receives various RRC parameters from an RRC layer 136 of the network and configures other components of the communication device 116, for example, the UCI circuitry 120 or feedback circuitry 124, accordingly. The RRC layer 136 may reside in the eNB 112, as shown, or other network equipment. Further, references to "higher layers" found in this description may include a reference to RRC layers, residing in UE or network equipment, in some embodiments.

As discussed above, various circumstances may occur in which CSI is dropped resulting in a less desirable operation of the eNB 112. Two embodiments may result in less CSI being dropped than previous operation. In a first embodiment, a multiple CSI transmission (for example, CSI from multiple serving cells) may be communicated using PUCCH format 3. In a second embodiment, a combination HARQ-ACK information and one-cell periodic CSI transmission may be communicated using PUCCH format 3. The HARQ-ACK information may include multiple ACK/NACK bits. To support such embodiments, the feedback circuitry 124 may have transmit (Tx) circuitry to transmit both CSI and HARQ-ACK information according to a PUCCH format 3.

Figure 2:
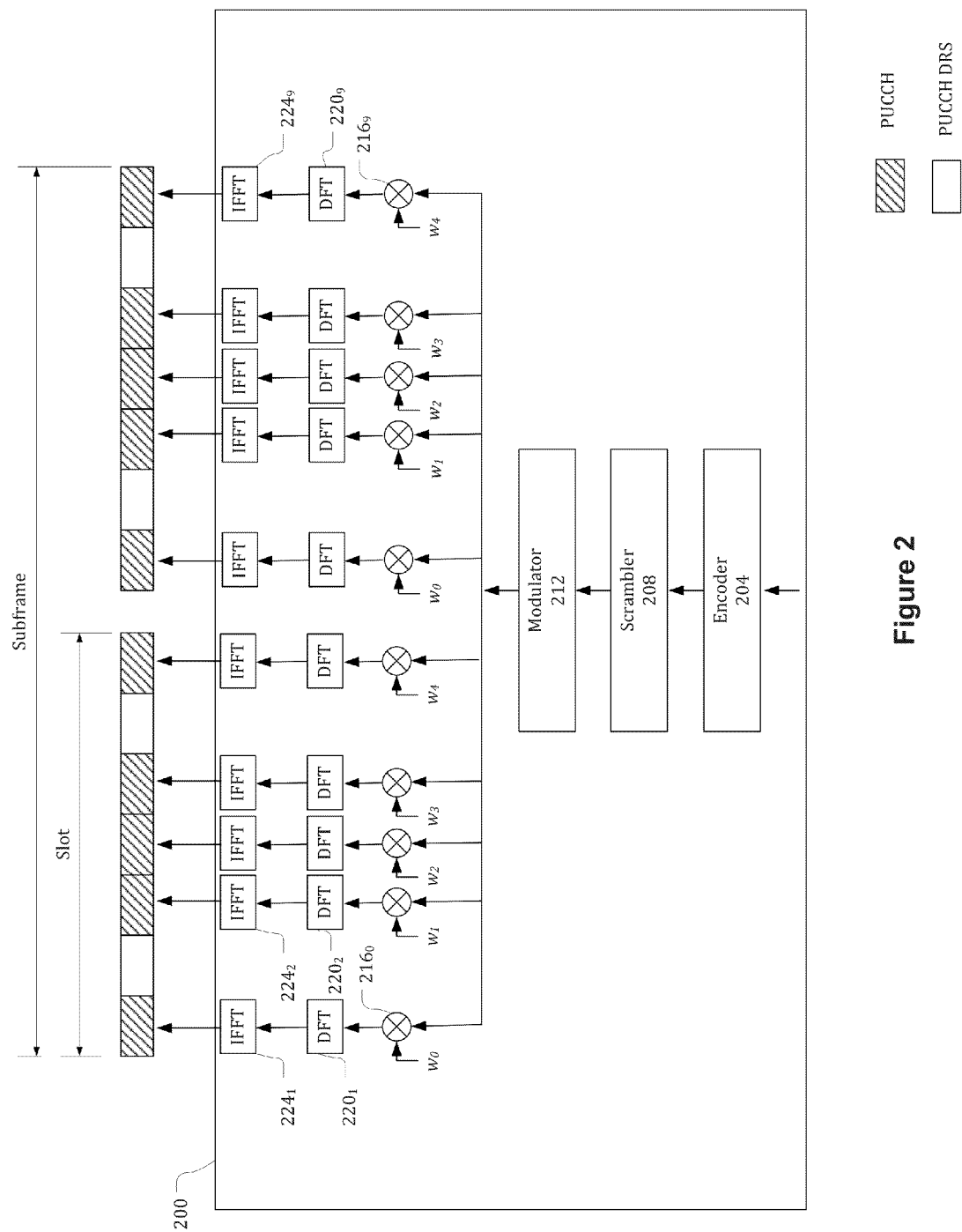
FIG. 2 illustrates transmit circuitry in accordance with various embodiments.

FIG. 2 illustrates Tx circuitry 200, which may be included in feedback circuitry 124 in accordance with some embodiments. The Tx circuitry 200 may be configured to transmit information according to PUCCH format 3.

The Tx circuitry 200 may include an encoder 204 that is to receive UCI bits, for example, ACK/NACK bits and/or CSI bits, and encode the UCI bits. The bit stream may be encoded, by encoder 204, using Reed Muller (RM) coding (single, dual, or quad RM coding), tailbiting convolutional coding (TBCC), or some other suitable coding process to provide an encoded bit stream.

The Tx circuitry 200 may further include a scrambler 208 that is to scramble the encoded bits with a cell-specific scrambling sequence. The encoded bit stream may be scrambled according to $$\tilde{b}(i) = (b(i) + c(i)) \bmod 2, \qquad \text{Eq. 1}$$

where $\tilde{b}(i)$ is the scrambled bits, $b(i)$ is the encoded bits, and $c(i)$ is a scrambling sequence, e.g., a pseudo-random sequence (for example, a Gold sequence, pseudo-noise (PN) sequence, Kasami sequence, etc.).

The Tx circuitry 200 may further include a modulator 212 to modulate the scrambled bits. In some embodiments, the modulator 212 may employ a quadrature phase shift keying (QPSK) modulation, resulting in a block of complex-valued modulation symbols. PUCCH format 3 may be capable of transmitting 48 bits using QPSK modulation.

Each complex-valued symbol may be multiplied, by multipliers $216_{0-9}$, with weighted values $w_{0-4}$ as shown to cyclically shift the symbols.

The Tx circuitry 200 may further include respective discrete Fourier transformers (DFTs) 220 that take signal generated in a time domain and allocate them in a frequency domain. The Tx circuitry 200 may further include respective inverse fast Fourier transformers (IFFTs) 224, which are typically larger than the DFTs, to convert the signals from the frequency domain into a time-domain waveform for transmission on respective PUCCH resource blocks. This may be referred to as DFT spread orthogonal frequency division multiplexing (DFTS-OFDM), which could result in a lower peak to average power ratio (PAPR). As can be seen in FIG. 2, resource blocks 1, 3, 4, 5, and 7 of the first and second slots may be PUCCH resource blocks, while resource blocks 2 and 6 are PUCCH demodulation reference signal (DRS) resource blocks.

If a serving cell c is a primary serving cell, the setting of a UE transmit power, $P_{PUCCH}$, for the PUCCH transmission in subframe i may be defined by:

$$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\} \text{dBm} \qquad \text{Eq. 2}$$

If the UE is not transmitting PUCCH for the primary serving cell, for the accumulation of transmit power command (TPC) command received with downlink control information (DCI) format 3/3A for PUCCH, the UE may assume that the UE transmit power for the PUCCH transmission in subframe i may be computed by $$P_{PUCCH}(i)=\min\{P_{CMAX,c}(i),P_{0\_PUCCH}+PL_c+g(i)\}\text{dBm} \qquad \text{Eq. 3}$$

where $P_{CMAX,c}(i)$ is a configured UE transmit power defined in 3GPP TS 36.101 v10.7.0 (13 Jul. 2012) in subframe i for serving cell c. If the UE transmits physical uplink shared channel (PUSCH) without PUCCH in subframe i for the serving cell c, for the accumulation of transmit power control (TPC) command received with downlink control information (DCI) format 3/3A for PUCCH, the UE may assume $P_{CMAX,c}(i)$ as given by §5.1.1.1 of 3GPP TS 36.213. If the UE does not transmit PUCCH and PUSCH in subframe i for the serving cell c, for the accumulation of TPC command received with DCI format 3/3A for PUCCH, the UE may compute $P_{CMAX,c}(i)$ assuming maximum power reduction (MPR)=0 dB, additional maximum power reduction (A-MPR)=0 dB, power managmenet maximum reduction (P-MPR)=0 dB and an allowed operating band edge transmission power relaxation ($\Delta T_C$)=dB, where MPR, A-MPR, P-MPR and $\Delta T_C$ may be defined consistently with related definitions in 3GPP TS 36.101.

If the UE is configured by higher layers to transmit PUCCH on two antenna ports, the value of $\Delta_{TxD}(F')$ may be provided by higher layers where each PUCCH format F' may be defined consistently with related definitions in Table 5.4-1 of 3GPP TS 36.211 v10.5.0 (26 Jun. 2012). If the UE is not configured by higher layers to transmit PUCCH on two antenna ports then $\Delta_{TxD}(F')=0$.

The delta F offset, $\Delta_{F\_PUCCH}(F)$, may be a performance offset value provided by higher layers for a PUCCH format (F) relative to PUCCH format 1a, where each PUCCH format (F) may be defined consistently with definitions in Table 5.4-1 of 3GPP TS 36.211.

$h(n_{CQI}, n_{HARQ}, n_{SR})$ may be a PUCCH format dependent value that may be a function of the number of information bits. $n_{CQI}$ may correspond to a number of information bits for CQI defined in section 5.2.3.3 in 3GPP TS 36.212 v10.6.0 (26 Jun. 2012). While CQI may be used throughout the present discussion, the described embodiments apply equally well to other types of CSI. Thus, unless otherwise stated, "CQI" may be replaced by "CSI" in the description. $n_{SR}$ is a scheduling request (SR) bit that is 1 if subframe i is configured for SR for the UE not having any associated transport block for uplink shared channel (UL-SCH), or zero otherwise. $n_{HARQ}$ may be a number of HARQ-ACK bits. If the UE is configured with one serving cell, $n_{HARQ}$ may be the number of ACK/NACK bits sent in subframe i; otherwise, the value of $n_{HARQ}$ may be defined consistent with definitions in section 10.1 of 3GPP TS 36.213. In some scenarios, for PUCCH format 1, 1a, and 1b $h(n_{CQI}, n_{HARQ}, n_{SR})=0$; for PUCCH format 1b with channel selection, if the UE is configured with more than one serving cell, $$h(n_{CQI}, n_{HARQ}, n_{SR}) = \frac{(n_{HARQ} - 1)}{2},$$

otherwise, $h(n_{CQI}, n_{HARQ}, n_{SR})=0$; for PUCCH format 2, 2a, 2b and normal cyclic prefix $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise;} \end{cases}$$

for PUCCH format 2 and extended cyclic prefix $$h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise;} \end{cases}$$

for PUCCH format 3, if the UE is configured by higher layers to transmit PUCCH on two antenna ports, or if the UE transmits more than 11 bits of HARQ-ACK/SR $$h(n_{CQI}, n_{HARQ}, n_{SR}) = \frac{n_{HARQ} + n_{SR} - 1}{3},$$

otherwise, $$h(n_{CQI}, n_{HARQ}, n_{SR}) = \frac{n_{HARQ} + n_{SR} - 1}{2}.$$

$P_{O\_PUCCH}$ may be a parameter composed of the sum of a parameter $P_{O\_NOMINAL\_PUCCH}$ provided by higher layers and a parameter $P_{O\_UE\_PUCCH}$ provided by higher layers.

UplinkPowerControl information elements may be defined consistent with definitions in 3GPP TS 36.331 v10.6.0 such as:

```
UplinkPowerControlCommon-v1020 ::=   SEQUENCE {
    deltaF-PUCCH-       ENUMERATED   {deltaF-1, deltaF0, deltaF1,
    Format3-r10                       deltaF2, deltaF3, deltaF4,
                                      deltaF5, deltaF6},
    deltaF-PUCCH-       ENUMERATED   {deltaF1, deltaF2, spare2,
    Format1bCS-r10                    spare1}
}
...
UplinkPowerControlDedicated-v1020 ::= SEQUENCE {
    deltaTxD-           DeltaTxD-         OPTIONAL,    -- Need
    OffsetListPUCCH-    OffsetListPUCCH-r10
    r10
OR
    pSRS-OffsetAp-      INTEGER (0..15)   OPTIONAL     -- Need
    r10
OR
}
...
DeltaFList-PUCCH ::=         SEQUENCE {
    deltaF-PUCCH-            ENUMERATED {deltaF-2, deltaF0,
    Format1                  deltaF2},
    deltaF-PUCCH-            ENUMERATED {deltaF1, deltaF3,
    Format1b                 deltaF5},
    deltaF-PUCCH-            ENUMERATED {deltaF-2, deltaF0,
    Format2                  deltaF1, deltaF2},
    deltaF-PUCCH-            ENUMERATED {deltaF-2, deltaF0,
    Format2a                 deltaF2},
    deltaF-PUCCH-            ENUMERATED {deltaF-2, deltaF0,
    Format2b                 deltaF2}
}
```

-continued

```
DeltaTxD-OffsetListPUCCH-
-r10 ::=                                    SEQUENCE {
   deltaTxD-OffsetPUCCH-Format1-r10   ENUMERATED {dB0, dB-2},
   deltaTxD-OffsetPUCCH-              ENUMERATED {dB0, dB-2},
   Format1a1b-r10
   deltaTxD-OffsetPUCCH-              ENUMERATED {dB0, dB-2},
   Format22a2b-r10
   deltaTxD-OffsetPUCCH-Format3-r10   ENUMERATED {dB0, dB-2},
   ...
}
``` deltaF-PUCCH-FormatX may correspond to $\Delta_{F\_PUCCH}(F)$ of Eq. 2, where "deltaF-1" corresponds to −1 dB, "deltaF0" corresponds to 0 dB, etc.; and deltaTxD-OffsetPUCCH-FormatX may correspond to $\Delta_{TxD}(F')$ of Eq. 2, where "dB0" corresponds to 0 dB, dB-2 corresponds to −2 dB, etc.

The above equations and parameters are designed to control PUCCH power based on operating parameters associated with UCI such as CSI, HARQ-ACK, and SR information. However, performance is compromised when transmitting CSI information with PUCCH format 3 since the current PUCCH format 3 can convey HARQ-ACK only. Therefore, embodiments describe provision of power control for transmitting CSI with PUCCH format 3 and, in particular, to power control for transmitting multi-cell p-CSI using PUCCH format 3 and for transmitting multi-bit HARQ-ACK information multiplexed with one-cell p-CSI using PUCCH format 3. In some embodiments, multi-cell p-CSI may be the CSI having a number of bits greater than a certain value, for example, 11 or 13 bits. In some embodiments, multi-cell p-CSI may include a plurality of sets of p-CSI that respectively correspond with a plurality of serving cells.

As used herein, p-CSI may be CSI for which a UE is configured, by upper layers, to periodically report. The UE may be configured to report p-CSI for a plurality of serving cells, e.g., multi-cell p-CSI, or for a single serving cell, one-cell p-CSI.

Table 1 provides link level simulation assumptions that may be used to

TABLE 1

| Parameters | Value |
|---|---|
| Carrier frequency | 2 GHz |
| System bandwidth | 5 MHz |
| Channel model | Extended typical urban (ETU) 3 km/h, Extended pedestrian A (EPA) 3 km/h |
| Frequency hopping | At slot boundary |
| Antenna set-up | 1Tx-2Rx, 2Tx-2Rx Spatial Orthogonal-Resource Transmit Diversity (SORTD) |
| Tx/Rx antenna correlation | Uncorrelated |
| Channel estimation | Practical |
| Cyclic prefix (CP) type | Normal CP |
| Signal bandwidth | 180 kHz |
| Noise estimation | Ideal |
| Number of UEs | 1 |
| Number of physical resource blocks (PRBs) for PUCCH | 1 |
| HARQ-ACK bits | 2, 4, 6, 8, 10, 12, 14, 16, 18, 20 bits |
| CSI bits | 4, 6, 8, 10, 12, 14, 16, 18, 20 bits |
| Receiver | Advanced receiver (Joint ML detector using reference signal (RS) and DATA), Normal receiver (channel estimation using RS and ML detection in DATA) |

TABLE 1-continued

| Parameters | Value |
|---|---|
| Channel coding for DFT spread orthogonal frequency division multiplexing (DFT-S-OFDM) format | (32, 0) PUSCH Reed Muller (RM) coding with circular buffer rate matching for ≤11 acknowledgement/negative acknowledgement (A/N) bits Dual RM using two (32, 0) PUSCH RM coding with circular buffer rate matching for >11 A/N bits |
| Remaining channels | See TS 36.211, TS 36.212, and TS 36.213 |
| Requirements | For multi-cell CSI transmission, the required SNR is given to meet BLER ≤ 1%. For HARQ-ACK transmission, the required SNR is given to meet Pr(DTX→ACK) ≤ 1%, Pr(ACK→NACK/DTX) ≤ 1%, and Pr(NACK→ACK) ≤ 0.1% |

The values of Table 1 may be interpreted consistently with relevant teachings of 3GPP TSs 36.211, 36.212, and 36.213.

A false alarm detection, e.g., a discontinuous transmission (DTX) detection, may be carried out when at least one HARQ-ACK is conveyed. A receive (Rx) false alarm detection threshold, represented as a reference value such that the probability that DTX bits are incorrectly interpreted as ACK bits is less than a reference probability (in this embodiment, the reference probability is 1%, may be set such that:

$$Pr(DTX \to ACK \text{ bits}) = \frac{\#(\text{false } ACK \text{ bits})}{\#(PUCCH\ DTX) \times \#(ACK/NACK \text{ bits})} \leq 10^{-2} \qquad \text{Eq. 4}$$

For purposes of the simulation, two types of detectors of a receiver may be considered for PUCCH format 3. The first is a joint ML detector, also called an advanced receiver, in which UCI is detected using both RS and data symbol jointly. This may be consistent with description found in "Performance evaluation of UL ACK/NACK multiplexing methods in LTE-A," 3GPP TSG RAN WG1 Meeting #6bis, R1-103468, Dresden, Germany, 28 Jun.-2 Jul. 2010.

The second type of detector of a receiver may be a normal detector in which UCI is detected from data symbols after channel estimation from reference signal symbols.

Figure 3:
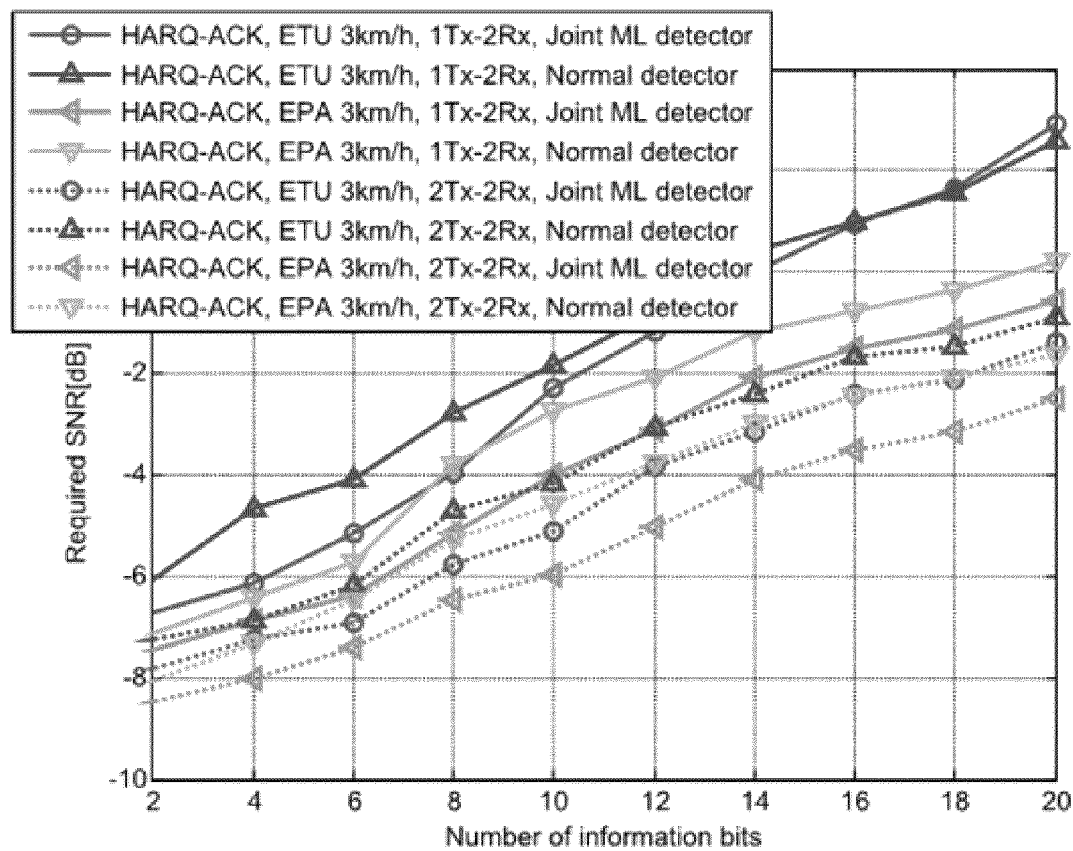
FIG. 3 illustrates performance of a system in which HARQ-ACK information is transmitted with PUCCH format 3 in accordance with various embodiments.

FIG. 3 illustrates performance of a system in which HARQ-ACK information is transmitted with PUCCH format 3. In particular, FIG. 3 illustrates a required signal to noise ratio (SNR) [dB] to meet Pr(DTX→ACK)≤1%, Pr(ACK→NACK/DTX)≤1%, and Pr(NACK→ACK)≤0.1% for the different simulation parameter sets.

Figure 4:
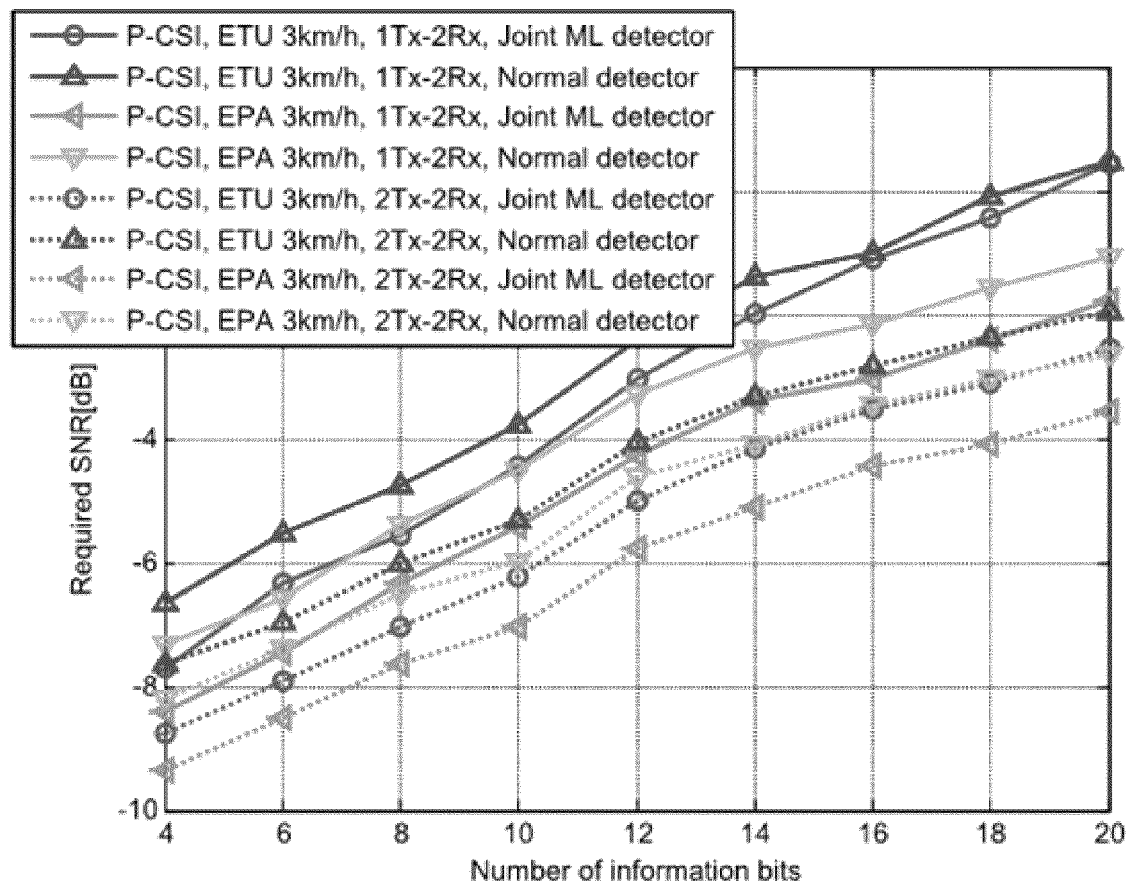
FIG. 4 illustrates performance of a system in which multi-cell P-CSI is transmitted with PUCCH format 3 in accordance with various embodiments.

FIG. 4 illustrates performance of a system in which multi-cell p-CSI is transmitted with PUCCH format 3. All CSI information from the plurality of serving cells may be jointly encoded for transmission in a subframe of one serving cell, for example, the primary serving cell. FIG. 4, in particular, illustrates required SNRs [dB] to meet BLER≤1% for the different simulation parameter sets.

Figure 5:
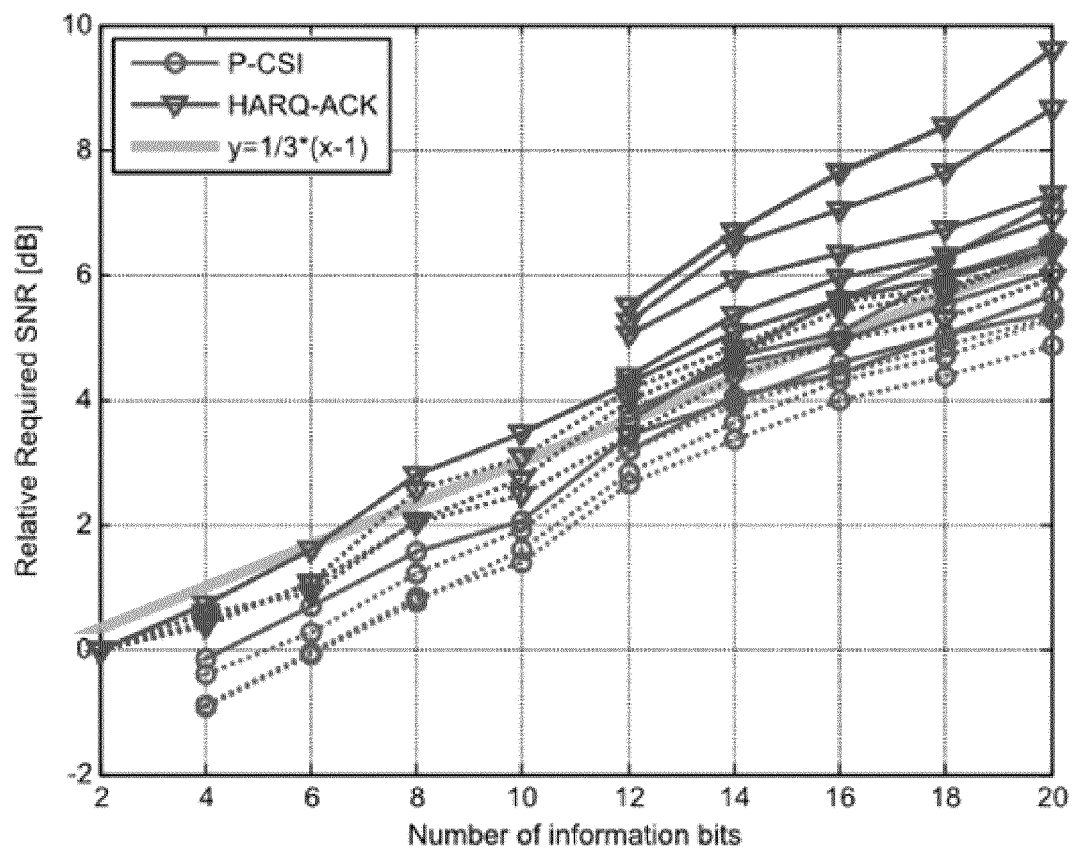
FIG. 5 illustrates a graph merged with content from FIGS. 3 and 4 in which two transmitters, using spatial orthogonal transmit diversity, or dual Reed Muller coding is used in accordance with various embodiments.

FIG. 5 illustrates a graph merged with content from FIGS. 3 and 4 of all cases (for example, ETU 3 km/h, EPA 3 km/hr, 1Tx-Rx, 2Tx-Rx, Joint ML detector, Normal detector) in an embodiment in which 2 Tx (SORTD) or dual RM encoding is used in accordance with some embodiments. Two Tx (SORTD) and dual RM encoding may be used, for example, in embodiment in which more than 11 UCI bits will be transmitted. The equation for h(.) may be given as $$h(n_{CQI}, n_{HARQ}, n_{SR}) = \frac{n_{HARQ} + n_{SR} - 1}{3} \qquad \text{Eq. 5}$$

The curves of FIG. 5 may be normalized assuming the 3GPP LTE-A Rel10 RRC parameters, for example, deltaF-PUCCH-Format3-r10 and delta TxD-OffsetPUCCH-Format3-r10, are properly used. For example, the curve for HARQ-ACK performances under ETU 3 km/h, 1Tx-2Rx, and joint ML detector may be normalized by a required SNR for 2 ACK/NACK bits under common conditions; the curve for HARQ-ACK performances under EPA 3 km/h, 2Tx-2Rx, and normal ML detector may be normalized by the required SNR for 2 ACK/NACK bits under common conditions; the curve for p-CSI performances under ETU 3 km/h, 1Tx-2Rx, and joint ML detector may be normalized by required SNR for 2 ACK/NACK bits under common conditions; the curve for P-CSI performances under EPA 3 km/h, 2Tx-2Rx, and normal ML detector may be normalized by a required SNR for 2 ACK/NACK bits under common conditions; etc. These assumptions may be due to current RRC parameters for PUCCH power control being given according to PUCCH formats (for example, PUCCH format 1/1a/1b, 2, 3, 1B with channel selection, etc.). Therefore, the reference offset for HARQ-ACK with 2 ACK/NACK bits may be used for normalization.

Figure 6:
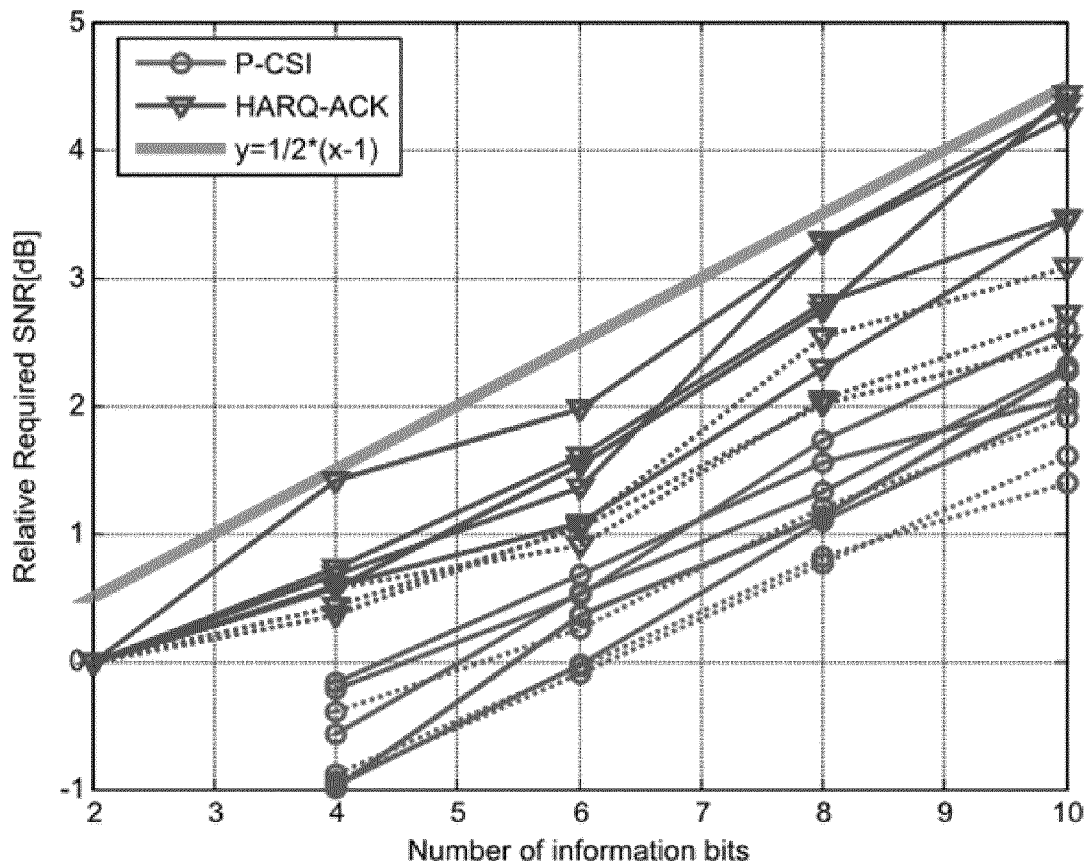
FIG. 6 illustrates a graph merged with content from FIGS. 3 and 4 in which single Reed Muller coding is used in accordance with various embodiments.

FIG. 6 illustrates a graph merged with content from FIGS. 3 and 4 of all cases (for example, ETU 3 km/h, EPA 3 km/hr, 1Tx-Rx, 2Tx-Rx, Joint ML detector, Normal detector) in an embodiment in which 1 Tx and single RM encoding is used in accordance with some embodiments. One Tx and single RM encoding may be used, for example, in embodiment in which less than 12 UCI bits will be transmitted. The equation for h(.) may be given as $$h(n_{CQI}, n_{HARQ}, n_{SR}) = \frac{n_{HARQ} + n_{SR} - 1}{2} \qquad \text{Eq. 6}$$

The curves of FIG. 6 may be normalized assuming the 3GPP LTE-A Rel10 RRC parameters, for example, deltaF-PUCCH-Format3-r10, are properly used. For example, the curve for HARQ-ACK performances under ETU 3 km/h, 1Tx-2Rx, and joint ML detector may be normalized by a required SNR for 2 ACK/NACK bits under common conditions; the curve for HARQ-ACK performances under EPA 3 km/h, 1Tx-2Rx, and normal ML detector may be normalized by the required SNR for 2 ACK/NACK bits under common conditions; the curve for p-CSI performances under ETU 3 km/h, 1Tx-2Rx, and joint ML detector may be normalized by required SNR for 2 ACK/NACK bits under common conditions; the curve for p-CSI performances under EPA 3 km/h, 1Tx-2Rx, and normal ML detector may be normalized by a required SNR for 2 ACK/NACK bits under common conditions; etc. These assumptions may be due to current RRC parameters for PUCCH power control being given according to PUCCH formats (for example, PUCCH format 1/1a/1b, 2, 3, 1b with channel selection, etc.). Therefore, the reference offset for HARQ-ACK with 2 ACK/NACK bits may be used for normalization.

In general, it may be seen that better performance, in terms of required SNR, may be found for p-CSI transmissions. This may be due to the different requirements for p-CSI as compared to HARQ-ACK. For p-CSI, the required SNR may be derived to meet BLER≤1%. For HARQ-ACK, on the other hand, the desired SNR may be derived to meet Pr(DTX→ACK)≤1%, Pr(ACK→NACK/DTX)≤1%, and Pr(NACK→ACK)≤0.1% (or simply, BER≤0.1%). Thus, the requirements for HARQ-ACK may be stricter than for p-CSI.

Based on these simulations, the slopes of ⅓ and ½ may be suitable for p-CSI power control using PUCCH format 3. However, as discussed above, since the existing compensation parameters of deltaF-PUCCH and delta TxD-Offset-PUCCH may be configured for each PUCCH format, for example, transmitting multi-cell p-CSI, HARQ-ACK, and p-CSI multiplexed with HARQ-ACK using PUCCH format 3 may use the same delta value. Thus, there is no way to appropriately compensate the transmit power with existing mechanisms. This is addressed by the various embodiments disclosed herein.

It may be noted that while embodiments of the present invention are discussed with respect to transmitting p-CSI only or HARQ-ACK only, the concepts of the embodiments are equally applicable to transmitting p-CSI multiplexed with HARQ-ACK.

In some embodiments, RRC parameters may be defined that correspond to p-CSI transmissions. That is, RRC parameters that may be used to provide appropriate transmit power control for UCI transmissions that include p-CSI. For example, RRC parameters deltaF-PUCCH-Format3-PCSI-r12 and/or deltaF-PUCCH-Format3-PCSI-AN-r12 may be defined for p-CSI. In some embodiments, deltaF-PUCCH-Format3-PCSI-r12 may be used for multi-cell p-CSI and deltaF-PUCCH-Format3-PCSI-AN-r12 may be used for single-cell p-CSI and HARQ/ACK.

In one embodiment, an RRC parameter may be:

```
UplinkPowerControlCommon-v1020 ::= SEQUENCE {
    deltaF-PUCCH-Format3-PCSI-r12   ENUMERATED {deltaF-6,
                                                deltaF-5, deltaF-4, deltaF-2,
                                                deltaF-1, deltaF0, deltaF1},
}
```

In another embodiment, an RRC parameter may be:

```
UplinkPowerControlCommon-v1020 ::= SEQUENCE {
    deltaF-PUCCH-Format3-PCSI-AN-r12   ENUMERATED {deltaF-6,
                                                   deltaF-5, deltaF-4,
                                                   deltaF-3, deltaF-2,
                                                   deltaF-1, deltaF0,
                                                   deltaF1},
}
```

In another embodiment, an RRC parameter may be:

```
UplinkPowerControlCommon-v1020 ::= SEQUENCE {
    deltaF-PUCCH-Format3-PCSI-r12   ENUMERATED {deltaF-2,
                                                deltaF-1, deltaF0,
                                                deltaF-1},
}
```

It may be noted that the minus values, for example, deltaF-X, may be more defined than existing PUCCH format due to their association with increased performances by p-CSI.

Figure 7:
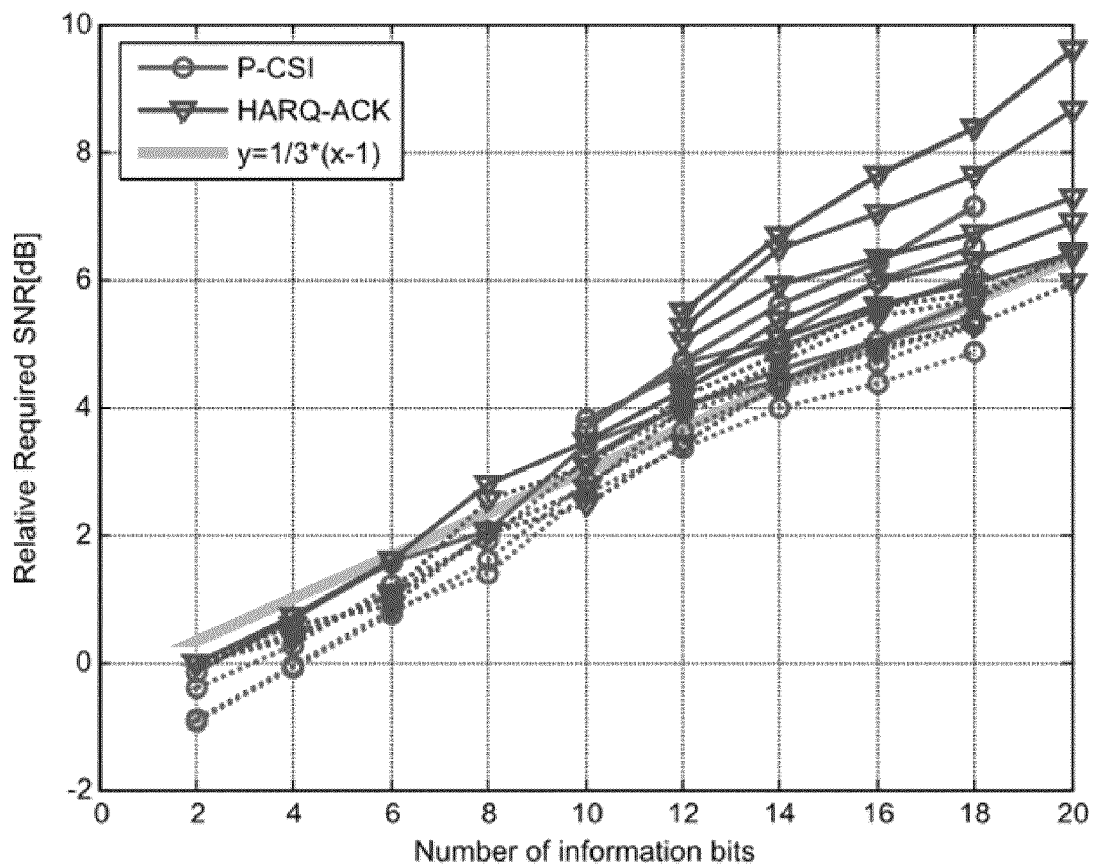
FIG. 7 illustrates a graph merged with content from FIGS. 3 and 4 in which two transmitters, using spatial orthogonal transmit diversity, or dual Reed Muller coding is used with deltaF-2 in accordance with various embodiments.
Figure 8:
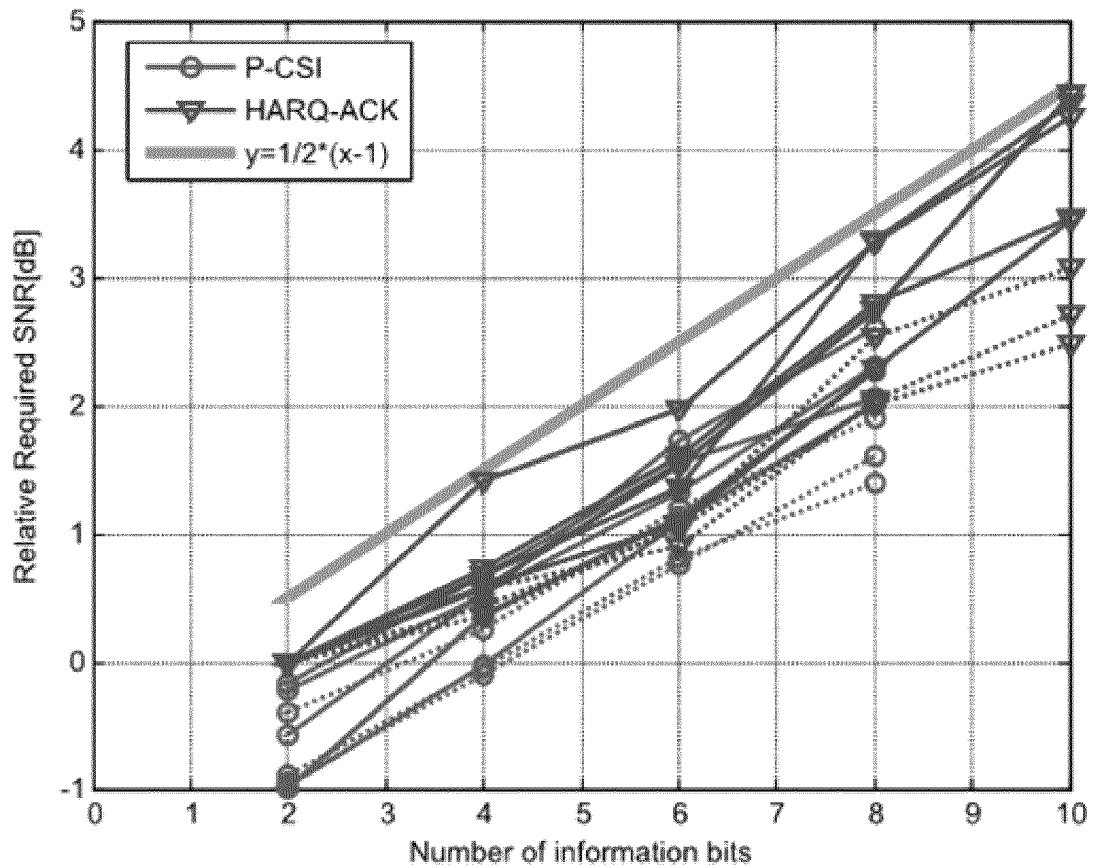
FIG. 8 illustrates a graph merged with content from FIGS. 3 and 4 in which single Reed Muller coding is used with deltaF-2 in accordance with various embodiments.

In an embodiment in which the RRC parameters corresponding to p-CSI are provided to configure transmit power specifically for UCI transmissions that include p-CSI with, for example, deltaF-2, the results in FIGS. 5 and 6 may become FIGS. 7 and 8, respectively. FIGS. 7 and 8 may reflect an improved curve fitting with less standard deviation among the curves.

Figure 9:
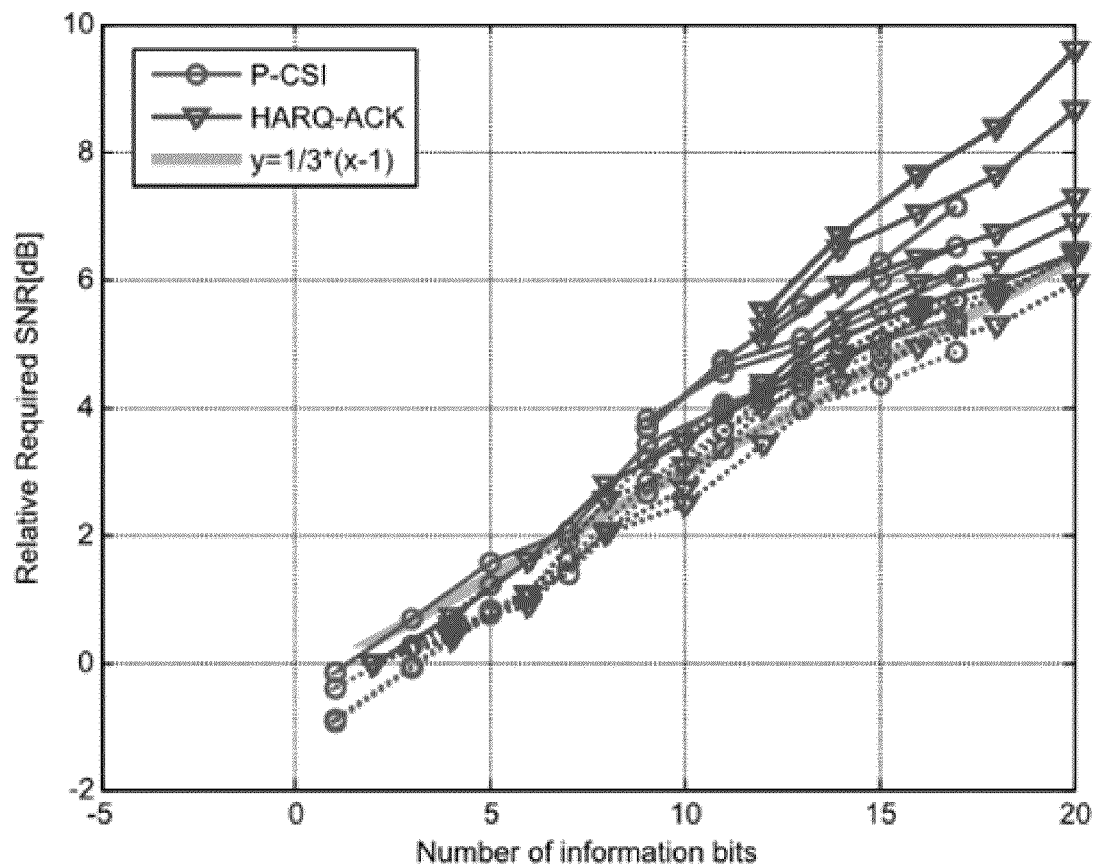
FIG. 9 illustrates a graph merged with content from FIGS. 3 and 4 in which two transmitters, using spatial orthogonal transmit diversity, or dual Reed Muller coding is used with deltaF-3 in accordance with various embodiments.
Figure 10:
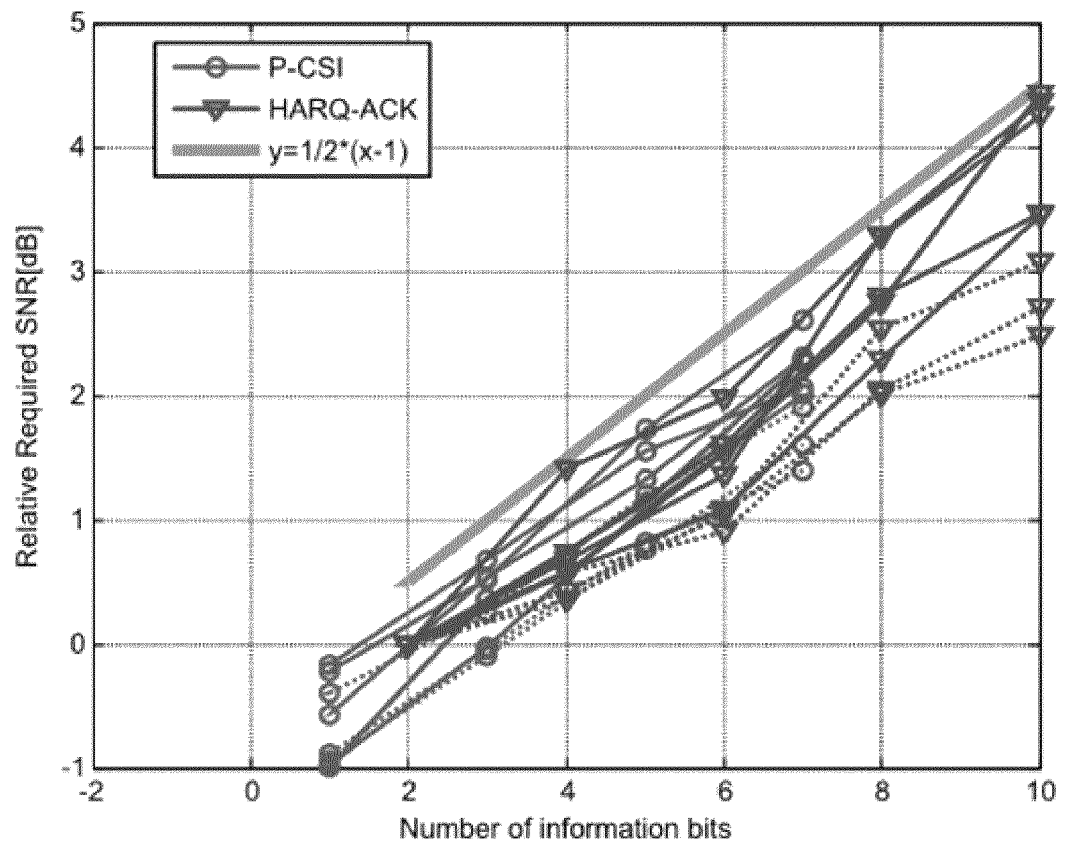
FIG. 10 illustrates a graph merged with content from FIGS. 3 and 4 in which single Reed Muller coding is used with deltaF-3 in accordance with various embodiments.

In an embodiment in which the RRC parameters are provided to configure transmit power specifically for UCI transmissions that include p-CSI with, for example, deltaF-3, the results in FIGS. 5 and 6 may become FIGS. 9 and 10, respectively. FIGS. 9 and 10 may reflect an improved curve fitting with less standard deviation among the curves.

In other embodiments, the equation h(.) may be modified by a CSI offset, α, to reflect a mismatch between HARQ-ACK and p-CSI. In some embodiments, h(.) may be provided as follows.

If $n_{CQI} \neq 0$,

For 2Tx (SORTD) or dual RM (used, for example, for transmitting more than 11 UCI bits), $$h(n_{CQI}, n_{HARQ}, n_{SR}) = \frac{n_{HARQ} + (n_{CQI} + \alpha) + n_{SR} - 1}{3}$$

Otherwise, (for example, 1Tx and single RM (used, for example, for transmitting less than 12 UCI bits)), $$h(n_{CQI}, n_{HARQ}, n_{SR}) = \frac{n_{HARQ} + (n_{CQI} + \alpha) + n_{SR} - 1}{2}$$

Else (i.e., $n_{cqi}=0$),

For 2Tx (SORTD) or dual RM (e.g., more than 11 UCI bits), $$h(n_{CQI}, n_{HARQ}, n_{SR}) = \frac{n_{HARQ} + n_{SR} - 1}{3}$$

Otherwise, (for example, 1Tx and single RM (e.g., less than 12 UCI bits)), $$h(n_{CQI}, n_{HARQ}, n_{SR}) = \frac{n_{HARQ} + n_{SR} - 1}{2}$$

If $n_{HARQ}=0$,

For 2Tx (SORTD) or dual RM (e.g., more than 11 UCI bits), $$h(n_{CQI}, n_{HARQ}, n_{SR}) = \frac{(n_{CQI} + \alpha) + n_{SR} - 1}{3}$$

Otherwise, (for example, 1Tx and single RM (e.g., less than 12 UCI bits)), $$h(n_{CQI}, n_{HARQ}, n_{SR}) = \frac{(n_{CQI} + \alpha) + n_{SR} - 1}{2}$$

Else (i.e., $n_{HARQ} \neq 0$),

For 2Tx (SORTD) or dual RM (e.g., more than 11 UCI bits), $$h(n_{CQI}, n_{HARQ}, n_{SR}) = \frac{n_{HARQ} + n_{CQI} + n_{SR} - 1}{3}$$

Otherwise, (for example, 1Tx and single RM (e.g., less than 12 UCI bits)), $$h(n_{CQI}, n_{HARQ}, n_{SR}) = \frac{n_{HARQ} + n_{CQI} + n_{SR} - 1}{2}$$

A common expression of the above may be:
for 2Tx (SORTD) or dual RM (e.g., more than 11 UCI bits), $$h(n_{CQI}, n_{HARQ}, n_{SR}) = \frac{n_{HARQ} + (n_{CQI} + \text{sgn}(n_{CQI}) * \alpha) + n_{SR} - 1}{3}$$

otherwise, (for example, 1Tx and single RM (e.g., less than 12 UCI bits)), $$h(n_{CQI}, n_{HARQ}, n_{SR}) = \frac{n_{HARQ} + (n_{CQI} + \text{sgn}(n_{CQI}) * \alpha) + n_{SR} - 1}{2}$$

where α is a real value and it can be configured by higher layer signaling or can be predetermined. The sgn(.) may be a sign function or signum function given by:

$$\text{sgn}(x) = \begin{cases} -1 & \text{if } x < 0, \\ 0 & \text{if } x = 0. \\ 1 & \text{if } x > 0 \end{cases}$$

In some embodiments, h(.) may be provided as follows.
For 2Tx (SORTD) or dual RM (for example, more than 11 UCI bits), $$h(n_{CQI}, n_{HARQ}, n_{SR}) = \frac{n_{HARQ} + \tilde{n}_{CQI} + n_{SR} - 1}{3}$$

Otherwise, (for example, 1Tx and single RM (for example, less than 12 UCI bits)), $$h(n_{CQI}, n_{HARQ}, n_{SR}) = \frac{n_{HARQ} + \tilde{n}_{CQI} + n_{SR} - 1}{2}$$

where
$\tilde{n}_{CQI}$ when $n_{HARQ} \neq 0$,
$\tilde{n}_{CQI} + \alpha$ when $n_{HARQ} = 0$.

Given that the performances for p-CSI in terms of required SNR are generally better than those for HARQ-ACK, the value α may be a minus value. FIGS. 7 and 8 illustrate the results for α=−2 and FIGS. 9 and 10 illustrates the results for α=−3.

FIGS. 11-14 illustrate results for various α values in accordance with some embodiments. However, other embodiments may include other values that may be designed for objectives and parameters of a particular embodiment.

Figure 11:
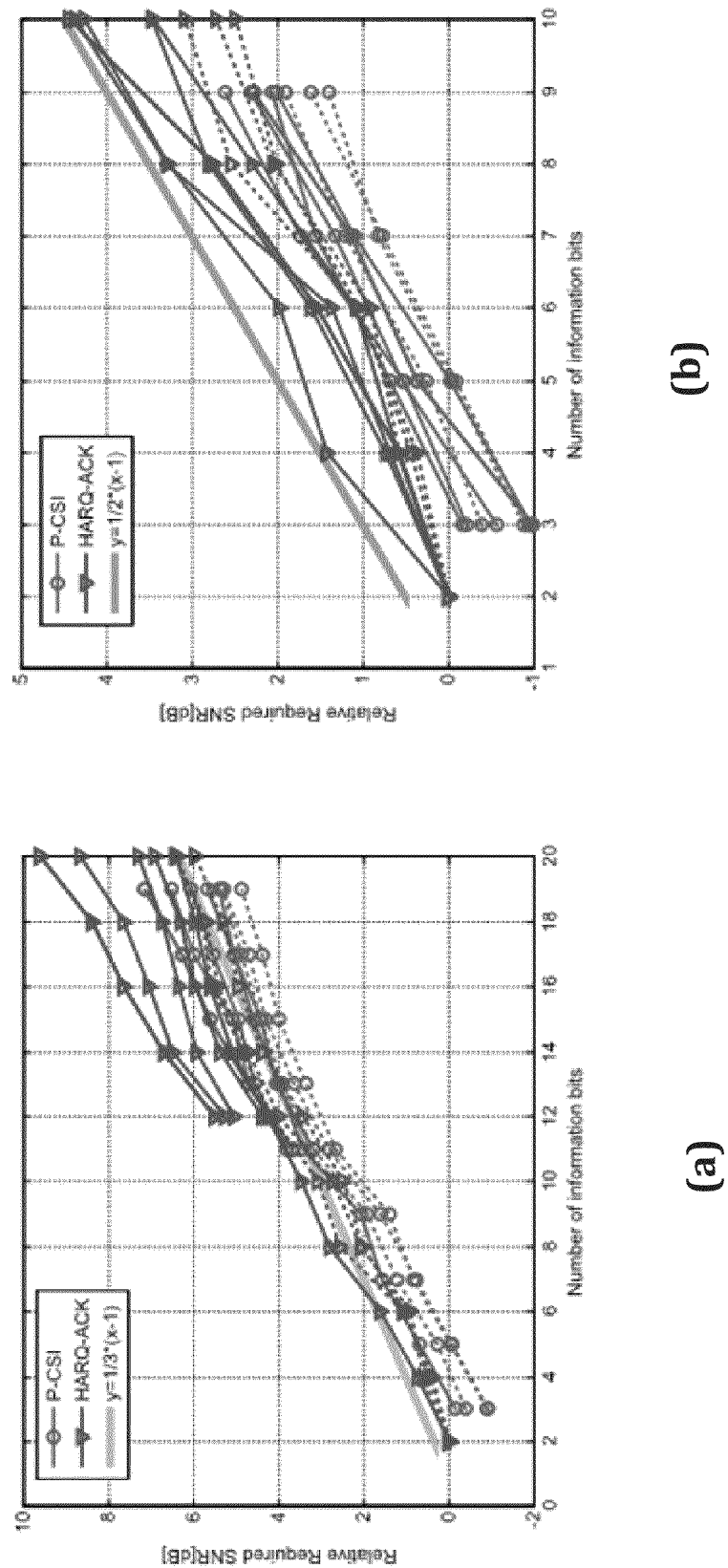
FIGS. 11-14 illustrate results for various CSI offset values in accordance with some embodiments.

FIG. 11 illustrates results with α=−1 in accordance with some embodiments. In particular, FIG. 11(*a*) shows the results for 2Tx (SORTD) or dual RM and FIG. 11(*b*) shows the results for 1Tx with single RM.

Figure 12:
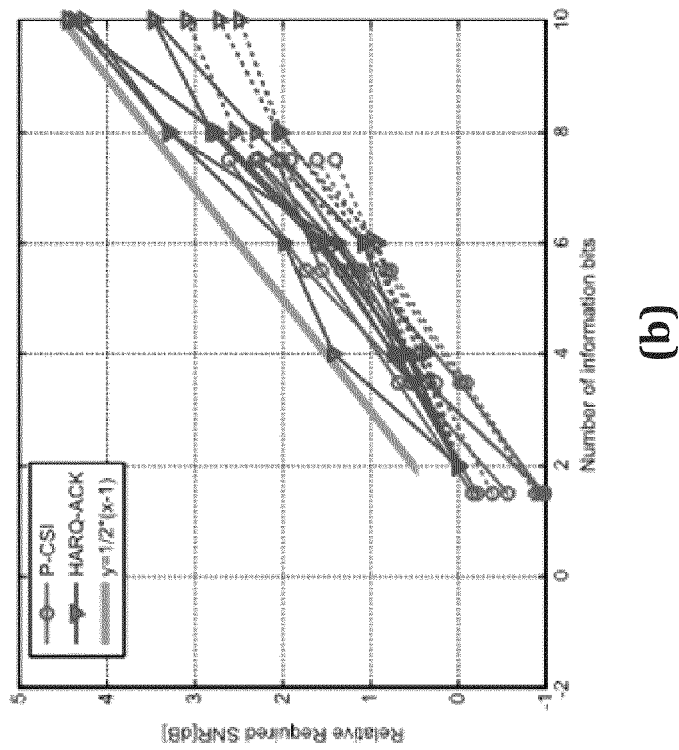
Figure 12:
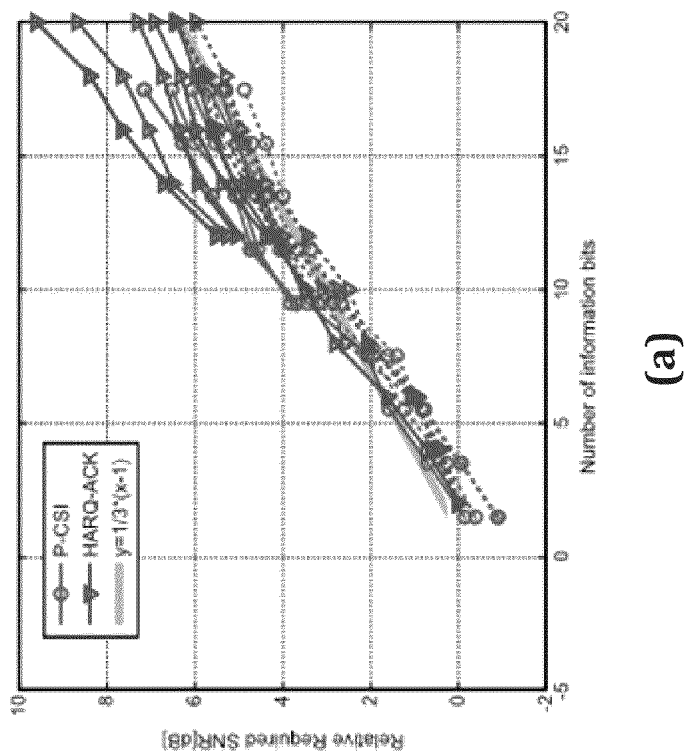

FIG. 12 illustrates results with α=−2.5 in accordance with some embodiments. In particular, FIG. 12(a) shows the results for 2Tx (SORTD) or dual RM and FIG. 12(b) shows the results for 1Tx with single RM.

Figure 13:
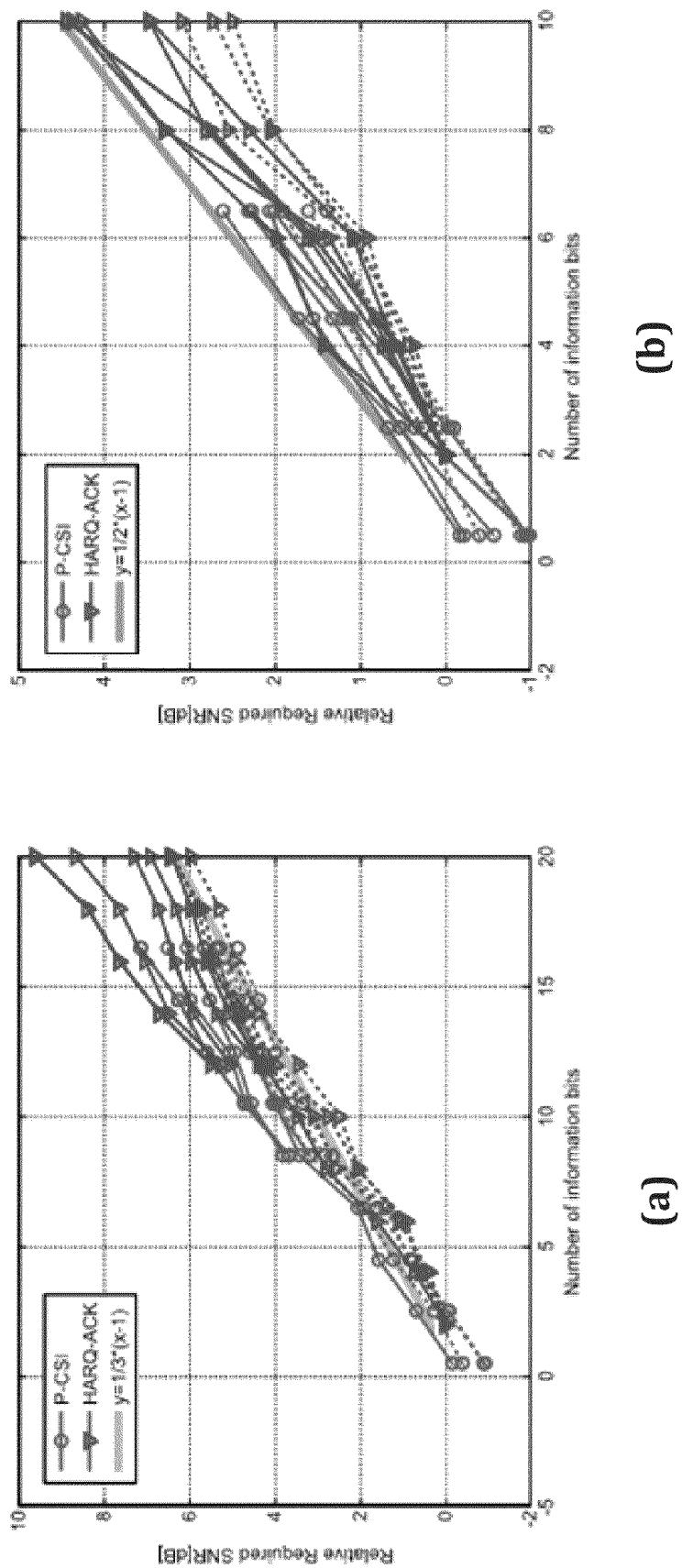

FIG. 13 illustrates results with α=−3.5 in accordance with some embodiments. In particular, FIG. 13(a) shows the results for 2Tx (SORTD) or dual RM and FIG. 13(b) shows the results for 1Tx with single RM.

Figure 14:
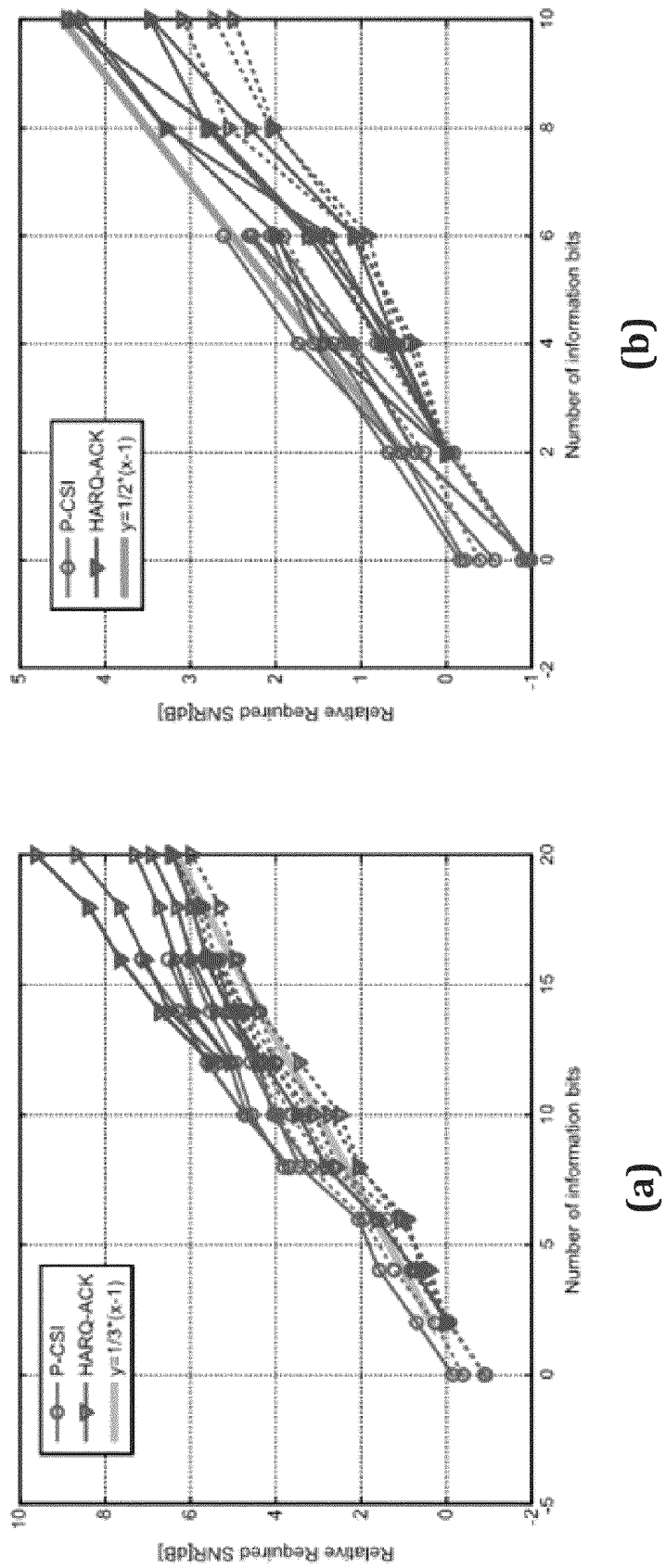

FIG. 14 illustrates results with α=−4 in accordance with some embodiments. In particular, FIG. 14(a) shows the results for 2Tx (SORTD) or dual RM and FIG. 14(b) shows the results for 1Tx with single RM.

As discussed above, α may be configured by RRC signaling. In some embodiments, an eNB may configure select a particular α value from a set of possible α values by RRC signaling. The sets may be, for example, {−4, 0}, {−3, 0}, {−2, 0}, {−1, 0}, {−3, −2, −1, 0}, {−2, −1, 0, 1}, {−3, −1, 1, 3}{−4, −2, 0, 2}, {−3, −1, 0, 1}, etc.

In some embodiments, to compensate the power for HARQ-ACK, the following may be applied:

For 2Tx (SORTD) or dual RM (more than 11 bits), $$h(n_{CQI}, n_{HARQ}, n_{SR}) = \frac{(n_{HARQ} + \beta) + (n_{CQI} + \alpha) + n_{SR} - 1}{3}$$

Otherwise, (for example, 1Tx and single RM (less than 12 bits)), $$h(n_{CQI}, n_{HARQ}, n_{SR}) = \frac{(n_{HARQ} + \beta) + (n_{CQI} + \alpha) + n_{SR} - 1}{2}$$

where α and β, which may be a HARQ offset, are real values that may be predetermined values or provided by RRC signaling.

Figure 15:
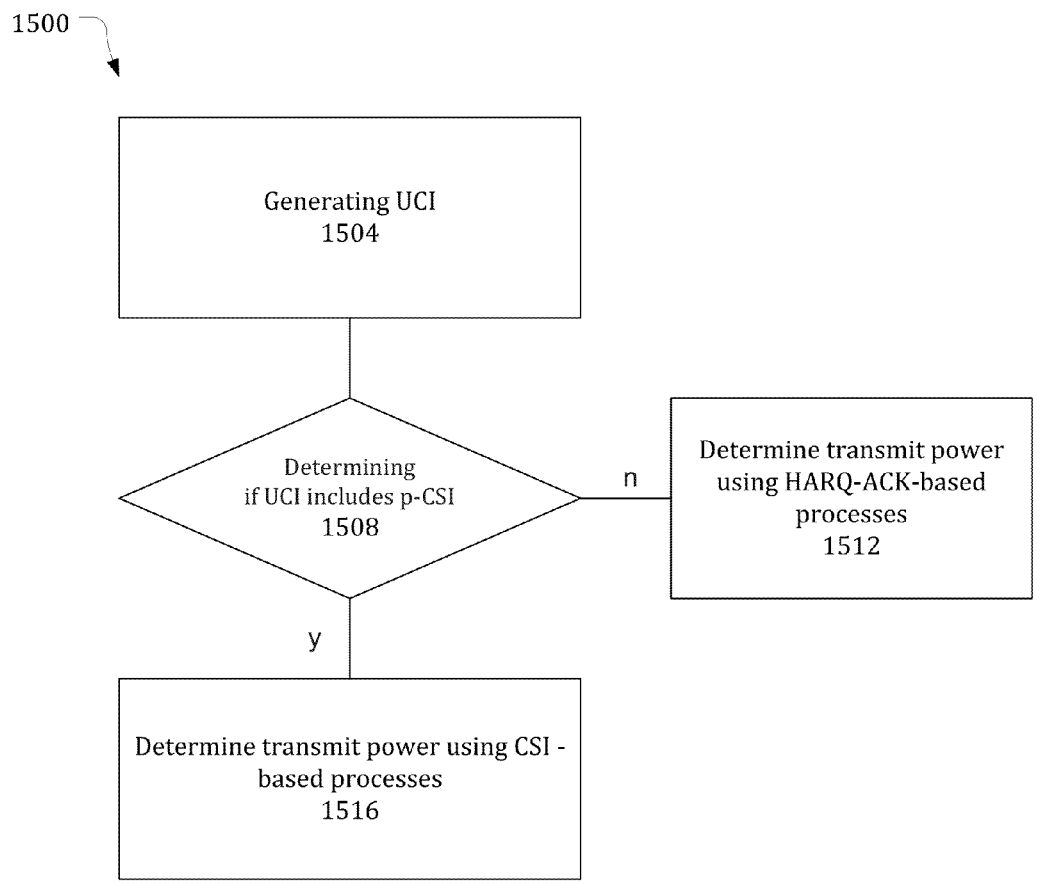
FIG. 15 illustrates a method of feeding back uplink control information in accordance with some embodiments.

FIG. 15 illustrates a method 1500 in accordance with some embodiments. Method 1500 may be performed by a communication device of a UE, such as communication device 116 of UE 104. In some embodiments, the UE may include and/or have access to one or more computer-readable media having instructions stored thereon, that, when executed, cause the UE, or the communication device 116, to perform some or all of the method 1500.

The method 1500 may include, at 1504, generating UCI. In some embodiments, the UCI may be generated by UCI circuitry and received by the feedback circuitry. The UCI may include single or multi-cell p-CSI, HARQ-ACK, and/or SR information.

While many of the embodiments are described in the context of carrier aggregation, with multiple p-CSI sets respectively corresponding with multiple serving cells, other embodiments may additionally/alternatively be applied to coordinated multipoint (CoMP) communications. In such embodiments, the UCI may include one or more p-CSI sets that respectively correspond with one or more CSI processes. A CSI process may be a combination of a non-zero power (NZP) CSI-reference signal (RS) and an interference measure resource (IMR), which may occupy a subset of resource elements (REs) configured as a zero-power CSI-RS.

The method 1500 may include, at 1508, determining if the UCI includes p-CSI.

If, at 1508, it is determined that the UCI does not include p-CSI, the method 1500 may advance to determining transmit power using HARQ-ACK-based processes at 1512. These processes may be similar to that described above with respect to h(.) in Eq. 2. In this situation, and in accordance with some embodiments, the feedback circuitry may determine uplink transmit power to transmit the UCI with PUCCH format 3 based on an RRC parameters that corresponds to HARQ-ACK transmissions. This may be, for example, similar to deltaF-PUCCH-Format3-r10 RRC parameter described above.

If, at 1508, it is determined that the UCI does include p-CSI, the method 1500 may advance to determining transmit power using CSI-based processes at 1516. These processes may be similar to that described above with respect to h(.) in Eq. 2 with appropriate CSI modifications based on, for example, a delta F offset or a CSI offset as described herein.

Figure 16:
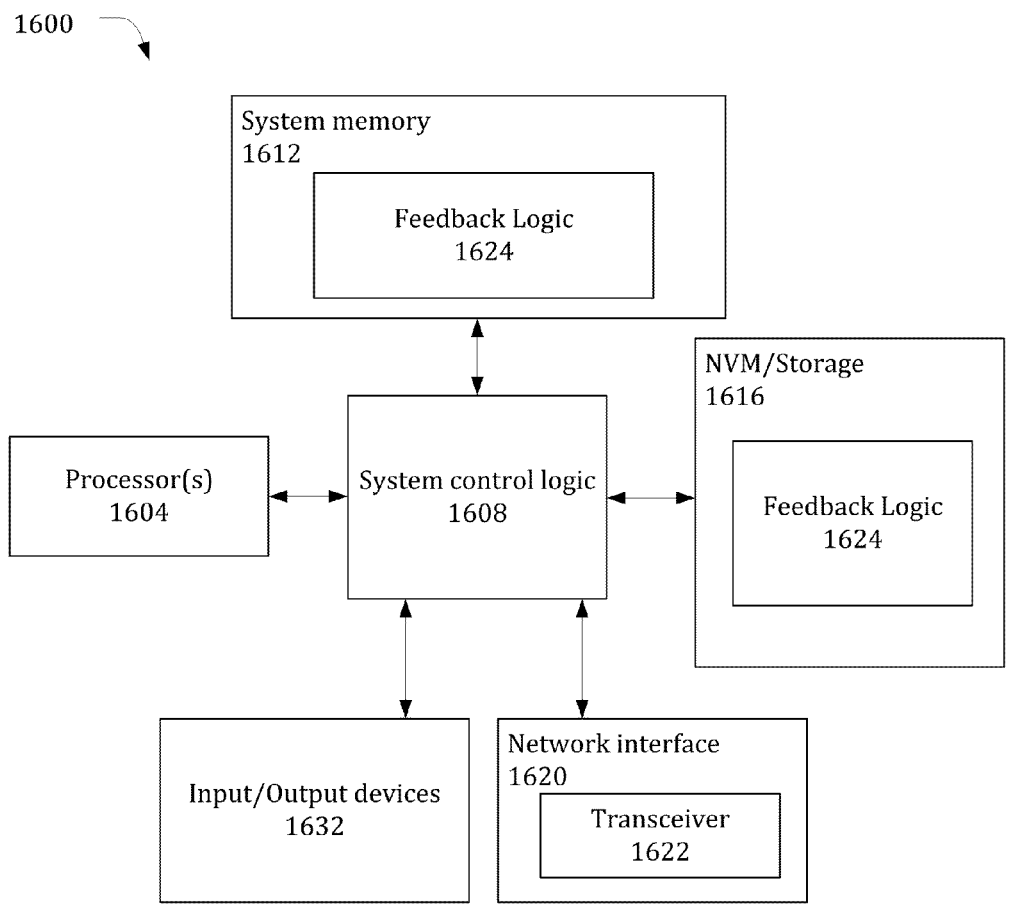
FIG. 16 schematically depicts an example system in accordance with various embodiments.

The UE 104 described herein may be implemented into a system using any suitable hardware and/or software to configure as desired. FIG. 16 illustrates, for one embodiment, an example system 1600 comprising one or more processor(s) 1604, system control logic 1608 coupled with at least one of the processor(s) 1604, system memory 1612 coupled with system control logic 1608, non-volatile memory (NVM)/storage 1616 coupled with system control logic 1608, a network interface 1620 coupled with system control logic 1608, and input/output (I/O) devices 1632 coupled with system control logic 1608.

The processor(s) 1604 may include one or more single-core or multi-core processors. The processor(s) 1604 may include any combination of general-purpose processors and dedicated processors (e.g., graphics processors, application processors, baseband processors, etc.).

System control logic 1608 for one embodiment may include any suitable interface controllers to provide for any suitable interface to at least one of the processor(s) 1604 and/or to any suitable device or component in communication with system control logic 1608.

System control logic 1608 for one embodiment may include one or more memory controller(s) to provide an interface to system memory 1612. System memory 1612 may be used to load and store data and/or instructions, e.g., feedback logic 1624. System memory 1612 for one embodiment may include any suitable volatile memory, such as suitable dynamic random access memory (DRAM), for example.

NVM/storage 1616 may include one or more tangible, non-transitory computer-readable media used to store data and/or instructions, e.g., feedback logic 1624. NVM/storage 1616 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1616 may include a storage resource physically part of a device on which the system 1600 is installed or it may be accessible by, but not necessarily a part of, the device. For example, the NVM/storage 1616 may be accessed over a network via the network interface 1620 and/or over Input/Output (I/O) devices 1632.

The feedback logic 1624 may include instructions that, when executed by one or more of the processors 1604, cause the system 1600 to perform feedback of UCI as described with respect to the above embodiments. In various embodiments, the feedback logic 1624 may include hardware, software, and/or firmware components that may or may not be explicitly shown in system 1600.

Network interface 1620 may have a transceiver 1622 to provide a radio interface for system 1600 to communicate over one or more network(s) and/or with any other suitable device. In various embodiments, the transceiver 1622 may be integrated with other components of system 1600. For example, the transceiver 1622 may include a processor of the processor(s) 1604, memory of the system memory 1612, and NVM/Storage of NVM/Storage 1616. Network interface 1620 may include any suitable hardware and/or firmware. Network interface 1620 may include a plurality of antennas to provide a multiple input, multiple output radio interface. Network interface 1620 for one embodiment may include, for example, a wired network adapter, a wireless network adapter, a telephone modem, and/or a wireless modem.

For one embodiment, at least one of the processor(s) 1604 may be packaged together with logic for one or more controller(s) of system control logic 1608. For one embodiment, at least one of the processor(s) 1604 may be packaged together with logic for one or more controllers of system control logic 1608 to form a System in Package (SiP). For one embodiment, at least one of the processor(s) 1604 may be integrated on the same die with logic for one or more controller(s) of system control logic 1608. For one embodiment, at least one of the processor(s) 1604 may be integrated on the same die with logic for one or more controller(s) of system control logic 1608 to form a System on Chip (SoC).

In various embodiments, the I/O devices 1632 may include user interfaces designed to enable user interaction with the system 1600, peripheral component interfaces designed to enable peripheral component interaction with the system 1600, and/or sensors designed to determine environmental conditions and/or location information related to the system 1600.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1620 to communicate with components of a positioning network, e.g., a global positioning system (GPS) satellite.

In various embodiments, the system 1600 may be a mobile computing device such as, but not limited to, a laptop computing device, a tablet computing device, a netbook, a smartphone, etc. In various embodiments, system 1600 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Some non-limiting examples are provided below.

Example 1 includes an apparatus to be employed in a user equipment, the apparatus comprising: uplink control information (UCI) circuitry to generate UCI that includes one or more sets of periodic channel state information (p-CSI) that respectively correspond with one or more serving cells or with one or more CSI processes; and feedback circuitry coupled with the UCI circuitry, the feedback circuitry to determine an uplink transmit power to transmit the UCI with a physical uplink control channel (PUCCH) format 3 based on a radio resource control (RRC) parameter that corresponds to p-CSI transmissions.

Example 2 may be the apparatus of example 1, wherein: the UCI circuitry is to generate other UCI that includes HARQ-ACK information without p-CSI; and the feedback circuitry is to determine uplink transmit power to transmit the UCI with PUCCH format 3 based on an RRC parameter that corresponds to HARQ-ACK transmissions.

Example 3 may be the apparatus of example 1, further comprising: an RRC layer to: receive, from an RRC layer of a network equipment, the RRC parameter; and to configure the feedback circuitry based on the RRC parameter.

Example 4 may be the apparatus of any of examples 1, 2, 3 or 8, wherein the RRC parameter provides a delta F offset that is a value provided for PUCCH format 3 and is relative to PUCCH format 1a.

Example 5 may be the apparatus of example 4, wherein the value is −6 decibels (dB), −5 dB, −4 dB, −3 dB, −2 dB, −1 dB, 0 dB, or 1 dB.

Example 6 may be the apparatus of example 4, wherein the value is −6 decibels (dB), −5 dB, −4 dB, −3 dB, or −2 dB.

Example 7 may be the apparatus of example 4, wherein the value is −2 decibels (dB), −1 dB, 0 dB, or 1 dB.

Example 8 may be the apparatus of example 1, wherein the UCI circuitry is to generate UCI that includes p-CSI for a plurality of serving cells and the feedback circuitry is to transmit the UCI in a subframe of a primary serving cell of the plurality of serving cells.

Example 9 includes an apparatus to be employed in a user equipment, the apparatus comprising: uplink control information (UCI) circuitry to generate uplink control information (UCI) that includes: periodic channel state information (p-CSI) for a plurality of serving cells; p-CSI for one or more CSI-processes; or p-CSI for a single serving cell and hybrid automatic repeat request-acknowledgment (HARQ-ACK) information; and feedback circuitry coupled with the UCI circuitry, the feedback circuitry to determine an uplink transmit power to transmit the UCI in a subframe with a physical uplink control channel (PUCCH) format that utilizes a quadrature phase shift keying modulation scheme and provides up to 48 bits per subframe, wherein the feedback circuitry is to determine the uplink transmit power based on a channel state information (CSI) offset.

Example 10 may be the apparatus of example 9, wherein the PUCCH format is a PUCCH format 3.

Example 11 may be the apparatus of example 9 or 10, wherein the UCI includes more than 11 bits, and the feedback circuitry is to: provide spatial orthogonal transmit diversity or dual Reed Muller coding; and determine the uplink transmit power based on $$h(n_{CQI}, n_{HARQ}, n_{SR}) = \frac{n_{HARQ} + (n_{CQI} + \text{sgn}(n_{CQI}) * \alpha) + n_{SR} - 1}{3},$$

where $\alpha$ is the CSI offset, $n_{HARQ}$ is a number of HARQ-ACK bits, $n_{CQI}$ is a number of p-CSI bits, $n_{SR}$ is a scheduling request bit, and and $$sgn(x) = \begin{cases} -1 & \text{if } x < 0, \\ 0 & \text{if } x = 0 \\ 1 & \text{if } x > 0 \end{cases}.$$

Example 12 may be the apparatus of example 9 or 10, wherein the UCI includes less than 12 bits, and the feedback circuitry is to: provide single Reed Muller coding; and determine the uplink transmit power based on $$h(n_{CQI}, n_{HARQ}, n_{SR}) = \frac{n_{HARQ} + (n_{CQI} + \text{sgn}(n_{CQI}) * \alpha) + n_{SR} - 1}{2},$$

where $\alpha$ is the CSI offset, $n_{HARQ}$ is a number of HARQ-ACK bits, $n_{CQI}$ is a number of p-CSI bits, $n_{SR}$ is a scheduling request bit, and $$sgn(x) = \begin{cases} -1 & \text{if } x < 0, \\ 0 & \text{if } x = 0 \\ 1 & \text{if } x > 0 \end{cases}.$$

Example 13 may be the apparatus of example 9 or 10, wherein the UCI includes more than 11 bits, and the feedback circuitry is to: provide spatial orthogonal transmit diversity or dual Reed Muller coding; and determine the uplink transmit power based on $$h(n_{CQI}, n_{HARQ}, n_{SR}) = \frac{n_{HARQ} + \tilde{n}_{CQI} + n_{SR} - 1}{3},$$

where $\alpha$ is the CSI offset, $n_{HARQ}$ is a number of HARQ-ACK bits, $n_{CQI}$ is a number of p-CSI bits, $n_{SR}$ is a scheduling request bit, $\tilde{n}_{CQI} = \tilde{n}_{CQI}$ when $n_{HARQ} \neq 0$, and $\tilde{n}_{CQI} = n_{CQI} + \alpha$ when $n_{HARQ} = 0$.

Example 14 may be the apparatus of example 9 or 10, wherein the UCI includes less than 12 bits, and the feedback circuitry is to: provide single Reed Muller coding; and determine the uplink transmit power based on $$h(n_{CQI}, n_{HARQ}, n_{SR}) = \frac{n_{HARQ} + \tilde{n}_{CQI} + n_{SR} - 1}{2},$$

where $\alpha$ is the CSI offset, $n_{HARQ}$ is a number of HARQ-ACK bits, $n_{CQI}$ is a number of p-CSI bits, $n_{SR}$ is a scheduling request bit, $\tilde{n}_{CQI} = n_{CQI}$ when $n_{HARQ} \neq 0$, and $\tilde{n}_{CQI} = n_{CQI} + \alpha$ when $n_{HARQ} = 0$.

Example 15 may be the apparatus of example 9 or 10, wherein the UCI includes more than 11 bits, and the feedback circuitry is to: provide spatial orthogonal transmit diversity or dual Reed Muller coding; and determine the uplink transmit power based on $$h(n_{CQI}, n_{HARQ}, n_{SR}) = \frac{(n_{HARQ} + \beta) + (n_{CQI} + \alpha) + n_{SR} - 1}{3},$$

where $\alpha$ is the CSI offset, $\beta$ is a HARQ offset, $n_{HARQ}$ is a number of HARQ-ACK bits, $n_{CQI}$ is a number of p-CSI bits, and $n_{SR}$ is a scheduling request bit.

Example 16 may be the apparatus of example 9 or 10, wherein the UCI includes less than 12 bits, and the feedback circuitry is to: provide single Reed Muller coding; and determine the uplink transmit power based on $$h(n_{CQI} + n_{HARQ}, n_{SR}) = \frac{(n_{HARQ} + \beta) + (n_{CQI} + \alpha) + n_{SR} - 1}{2},$$

where $\alpha$ is the CSI offset, $\beta$ is a HARQ offset, $n_{HARQ}$ is a number of HARQ-ACK bits, $n_{CQI}$ is a number of p-CSI bits, and $n_{SR}$ is a scheduling request bit.

Example 17 includes one or more computer readable media having instructions that, when executed, cause a user equipment to comprising: generate first uplink control information (UCI) that includes periodic channel state information (p-CSI) for a plurality of serving cells, a plurality of CSI processes, or for a single serving cell and hybrid automatic repeat request-acknowledgment (HARQ-ACK) information, and generate second UCI that includes HARQ-ACK information without p-CSI; determine a first uplink transmit power to transmit the first UCI in a subframe with a physical uplink control channel (PUCCH) format 3 based on a CSI parameter, and determine a second uplink transmit power to transmit the second UCI based on a HARQ-ACK parameter.

Example 18 may be the one or more computer-readable media of example 17, wherein the CSI parameter is a CSI offset or a delta F offset.

Example 19 may be the one or more computer-readable media of example 18, wherein the UCI includes more than 11 bits, the CSI parameter is a CSI offset, and instructions, when executed, cause the UE to: provide spatial orthogonal transmit diversity or dual Reed Muller coding; and determine the uplink transmit power based on $$h(n_{CQI} + n_{HARQ}, n_{SR}) = \frac{n_{HARQ} + (n_{CQI} + \text{sgn}(n_{CQI}) * \alpha) + n_{SR} - 1}{3},$$

where $\alpha$ is the CSI offset, $n_{HARQ}$ is a number of HARQ-ACK bits, $n_{CQI}$ is a number of p-CSI bits, $n_{SR}$ is a scheduling request bit, and $$sgn(x) = \begin{cases} -1 & \text{if } x < 0, \\ 0 & \text{if } x = 0 \\ 1 & \text{if } x > 0 \end{cases}.$$

Example 20 may be the one or more computer-readable media of example 17, wherein the CSI parameters is a radio resource control (RRC) parameter the provides a delta F offset that is a value provided for PUCCH format 3 and is relative to PUCCH format 1a.

Example 21 may be the one or more computer-readable media of example 20, wherein value is −6 decibels (dB), −5 dB, −4 dB, −3 dB, −2 dB, −1 dB, 0 dB, or 1 dB.

Example 22 may be the one or more computer-readable media of example 20, wherein the value is −6 decibels (dB), −5 dB, −4 dB, −3 dB, or −2 dB.

Example 23 may be the one or more computer-readable media of example 20, wherein the value is −2 decibels (dB), −1 dB, 0 dB, or 1 dB.

Example 24 may include a user equipment comprising: one or more computer-readable media of any of examples 17-23;

one or more processors coupled with the one or more computer-readable media to execute the instructions; and a touch-screen user interface.

Example 25 may include a method of feeding back control information in a wireless network, the method comprising: generating uplink control information (UCI) that includes one or more sets of periodic channel state information (p-CSI) that respectively correspond with one or more serving cells or with one or more CSI processes; and determining an uplink transmit power to transmit the UCI with a physical uplink control channel (PUCCH) format 3 based on a radio resource control (RRC) parameter that corresponds to p-CSI transmissions.

Example 26 may include the method of example 25, further comprising: generating other UCI that includes HARQ-ACK information without p-CSI; and determining uplink transmit power to transmit the UCI with PUCCH format 3 based on an RRC parameter that corresponds to HARQ-ACK transmissions.

Example 27 may include the method of example 25, further comprising: receiving, from an RRC layer of a network equipment, the RRC parameter; and configuring the feedback circuitry based on the RRC parameter.

Example 28 may include the method of example 25, wherein the RRC parameter provides a delta F offset that is a value provided for PUCCH format 3 and is relative to PUCCH format 1a.

Example 29 may include the method of example 28, wherein the value is selected from one of the following sets of values: −6 decibels (dB), −5 dB, −4 dB, −3 dB, −2 dB, −1 dB, 0 dB, and 1 dB; −6 decibels (dB), −5 dB, −4 dB, −3 dB, and −2 dB; or −2 decibels (dB), −1 dB, 0 dB, and 1 dB.

Example 30 may include the method of example 25, further comprising: generating UCI that includes p-CSI for a plurality of serving cells; and transmitting the UCI in a subframe of a primary serving cell of the plurality of serving cells.

Example 31 may be an apparatus comprising user equipment to perform the method of any of examples 25-30.

Example 32 may include an apparatus to be employed in a user equipment, the apparatus comprising: uplink control information (UCI) circuitry to generate UCI that includes: periodic channel state information (p-CSI) for a plurality of serving cells; p-CSI for one or more CSI-processes; or p-CSI for a single serving cell and hybrid automatic repeat request-acknowledgment (HARQ-ACK) information; and feedback circuitry to determine an uplink transmit power to transmit the UCI in a subframe with a physical uplink control channel (PUCCH) format that utilizes a quadrature phase shift keying modulation scheme and provides up to 48 bits per subframe, wherein the feedback circuitry is to determine the uplink transmit power based on a channel state information (CSI) offset.

Example 33 may be the apparatus of example 32, wherein the PUCCH format is a PUCCH format 3, the UCI includes more than 11 bits, and the feedback circuitry is to: provide spatial orthogonal transmit diversity or dual Reed Muller coding; and determine the uplink transmit power based on $$h(n_{CQI} + n_{HARQ}, n_{SR}) = \frac{n_{HARQ} + (n_{CQI} + \text{sgn}(n_{CQI}) * \alpha) + n_{SR} - 1}{3},$$

where α is the CSI offset, $n_{HARQ}$ is a number of HARQ-ACK bits, $n_{CQI}$ is a number of p-CSI bits, $n_{SR}$ is a scheduling request bit, and and $$\text{sgn}(x) = \begin{cases} -1 & \text{if } x < 0, \\ 0 & \text{if } x = 0. \\ 1 & \text{if } x > 0 \end{cases}$$

Example 34 may be the apparatus of example 32, wherein the PUCCH format is a PUCCH format 3, the UCI includes less than 12 bits, and the feedback circuitry is to: provide single Reed Muller coding; and determine the uplink transmit power based on $$h(n_{CQI} + n_{HARQ}, n_{SR}) = \frac{n_{HARQ} + (n_{CQI} + \text{sgn}(n_{CQI}) * \alpha) + n_{SR} - 1}{2},$$

where α is the CSI offset, $n_{HARQ}$ is a number of HARQ-ACK bits, $n_{CQI}$ is a number of p-CSI bits, $n_{SR}$ is a scheduling request bit, and $$\text{sgn}(x) = \begin{cases} -1 & \text{if } x < 0, \\ 0 & \text{if } x = 0. \\ 1 & \text{if } x > 0 \end{cases}$$

Example 35 may be the apparatus of example 32, wherein the PUCCH format is a PUCCH format 3, the UCI includes more than 11 bits, and the feedback circuitry is to: provide spatial orthogonal transmit diversity or dual Reed Muller coding; and determine the uplink transmit power based on $$h(n_{CQI} + n_{HARQ}, n_{SR}) = \frac{n_{HARQ} + \tilde{n}_{CQI} + n_{SR} - 1}{3},$$

where α is the CSI offset, $n_{HARQ}$ is a number of HARQ-ACK bits, $n_{CQI}$ is a number of p-CSI bits, $n_{SR}$ is a scheduling request bit, $\tilde{n}_{CQI} = n_{CQI}$ when $n_{HARQ} \neq 0$, and $\tilde{n}_{CQI} = n_{CQI} + \alpha$ when $n_{HARQ} = 0$.

Example 36 may be the apparatus of example 32, wherein the PUCCH format is a PUCCH format 3, the UCI includes less than 12 bits, and the feedback circuitry is to: provide single Reed Muller coding; and determine the uplink transmit power based on $$h(n_{CQI}, n_{HARQ}, n_{SR}) = \frac{n_{HARQ} + \tilde{n}_{CQI} + n_{SR} - 1}{2},$$

where α is the CSI offset, $n_{HARQ}$ is a number of HARQ-ACK bits, $n_{CQI}$ is a number of p-CSI bits, $n_{SR}$ is a scheduling request bit, $\tilde{n}_{CQI} = n_{CQI}$ when $n_{HARQ} \neq 0$, and $\tilde{n}_{CQI} + \alpha$ when $n_{HARQ} = 0$.

Example 37 may be the apparatus of example 32, wherein the PUCCH format is a PUCCH format 3, the UCI includes more than 11 bits, and the feedback circuitry is to: provide spatial orthogonal transmit diversity or dual Reed Muller coding; and determine the uplink transmit power based on $$h(n_{CQI}, n_{HARQ}, n_{SR}) = \frac{(n_{HARQ} + \beta) + (n_{CQI} + \alpha) + n_{SR} - 1}{3},$$

where α is the CSI offset, β is a HARQ offset, $n_{HARQ}$ is a number of HARQ-ACK bits, $n_{CQI}$ is a number of p-CSI bits, and $n_{SR}$ is a scheduling request bit.

Example 38 may be the apparatus of example 32, wherein the PUCCH format is a PUCCH format 3, the UCI includes less than 12 bits, and the feedback circuitry is to: provide single Reed Muller coding; and determine the uplink transmit power based on $$h(n_{CQI}, n_{HARQ}, n_{SR}) = \frac{(n_{HARQ} + \beta) + (n_{CQI} + \alpha) + n_{SR} - 1}{2},$$

where α is the CSI offset, β is a HARQ offset, $n_{HARQ}$ is a number of HARQ-ACK bits, $n_{CQI}$ is a number of p-CSI bits, and $n_{SR}$ is a scheduling request bit.

Example 39 includes an apparatus to be employed in a user equipment, the apparatus comprising: means to generate first uplink control information (UCI) that includes periodic channel state information (p-CSI) for a plurality of serving cells, a plurality of CSI processes, or for a single serving cell and hybrid automatic repeat request-acknowledgment (HARQ-ACK) information, and generate second UCI that includes HARQ-ACK information without p-CSI; means to determine a first uplink transmit power to transmit the first UCI in a subframe with a physical uplink control channel (PUCCH) format 3 based on a CSI parameter, and determine a second uplink transmit power to transmit the second UCI based on a HARQ-ACK parameter.

Example 40 may be the apparatus of example 39, wherein the CSI parameter is a CSI offset or a delta F offset.

Example 41 may be the apparatus of example 39, wherein the UCI includes more than 11 bits, the CSI parameter is the CSI offset, and the apparatus further includes: means to provide spatial orthogonal transmit diversity or dual Reed Muller coding; and means to determine the uplink transmit power based on $$h(n_{CQI}, n_{HARQ}, n_{SR}) = \frac{n_{HARQ} + (n_{CQI} + \text{sgn}(n_{CQI}) * \alpha) + n_{SR} - 1}{3},$$

where α is the CSI offset, $n_{HARQ}$ is a number of HARQ-ACK bits, $n_{CQI}$ is a number of p-CSI bits, $n_{SR}$ is a scheduling request bit, and $$\text{sgn}(x) = \begin{cases} -1 & \text{if } x < 0, \\ 0 & \text{if } x = 0. \\ 1 & \text{if } x > 0 \end{cases}$$

Example 42 may be the apparatus of example 39, wherein the CSI parameters is a radio resource control (RRC) parameter the provides a delta F offset that is a value provided for PUCCH format 3 and is relative to PUCCH format 1a.

Example 43 includes the apparatus of example 42, wherein the value is selected from one of the following sets: −6 decibels (dB), −5 dB, −4 dB, −3 dB, −2 dB, −1 dB, 0 dB, and 1 dB; −6 decibels (dB), −5 dB, −4 dB, −3 dB, and −2 dB; and −2 decibels (dB), −1 dB, 0 dB, and 1 dB.

What is claimed is:

1. An apparatus comprising:
   uplink control information (UCI) circuitry to generate UCI that includes one or more sets of periodic channel state information (p-CSI) that respectively correspond with one or more serving cells or with one or more channel state information (CSI) processes; and
   feedback circuitry coupled with the UCI circuitry, the feedback circuitry to determine an uplink transmit power to transmit the UCI with a physical uplink control channel (PUCCH) format 3 based on a radio resource control (RRC) parameter that corresponds to p-CSI transmissions,
   wherein the RRC parameter provides a delta F offset that is a value provided for PUCCH format 3 and is relative to PUCCH format 1a and the value is selected from a set consisting of −6 decibels (dB), −5 dB, −4 dB, −3 dB, −2 dB, −1 dB, 0 dB, and 1 dB.

2. The apparatus of claim 1, wherein:
   the UCI circuitry is to generate other UCI that includes HARQ-ACK information without p-CSI; and
   the feedback circuitry is to determine uplink transmit power to transmit the UCI with PUCCH format 3 based on an RRC parameter that corresponds to HARQ-ACK transmissions.

3. The apparatus of claim 1, further comprising:
   an RRC layer to:
   receive, from an RRC layer of a network equipment, the RRC parameter; and
   configure the feedback circuitry based on the RRC parameter.

4. The apparatus of claim 1, wherein the value is −6 decibels (dB), −5 dB, −4 dB, −3 dB, or −2 dB.

5. The apparatus of claim 1, wherein the value is −2 decibels (dB), −1 dB, 0 dB, or 1 dB.

6. The apparatus of claim 1, wherein the UCI circuitry is to generate UCI that includes p-CSI for a plurality of serving cells and the feedback circuitry is to transmit the UCI in a subframe of a primary serving cell of the plurality of serving cells.

7. An apparatus comprising:
   uplink control information (UCI) circuitry to generate uplink control information (UCI) that includes:
   periodic channel state information (p-CSI) for a plurality of serving cells;
   p-CSI for one or more channel state information (CSI)-processes; or
   p-CSI for a single serving cell and hybrid automatic repeat request—acknowledgment (HARQ-ACK) information; and
   feedback circuitry coupled with the UCI circuitry, the feedback circuitry to determine an uplink transmit power to transmit the UCI in a subframe with a physical uplink control channel (PUCCH) format that utilizes a quadrature phase shift keying modulation scheme and provides up to 48 bits per subframe,
   wherein:
   the feedback circuitry is to determine the uplink transmit power based on a CSI offset;
   the UCI includes more than 11 bits, and the feedback circuitry is to
   provide spatial orthogonal transmit diversity or dual Reed Muller coding; and
   determine the uplink transmit power based on $$h(n_{CQI}, n_{HARQ}, n_{SR}) = \frac{n_{HARQ} + (n_{CQI} + \text{sgn}(n_{CQI}) * \alpha) + n_{SR} - 1}{3}$$

where α is the CSI offset, $n_{HARQ}$ is a number of HARQ-ACK bits, $n_{CQI}$ is a number of p-CSI bits, $n_{SR}$ is a scheduling request bit, and $$\mathrm{sgn}(x) = \begin{cases} -1 & \text{if } x < 0, \\ 0 & \text{if } x = 0. \\ 1 & \text{if } x > 0 \end{cases}$$

8. The apparatus of claim 7, wherein the PUCCH format is a PUCCH format 3.

9. An apparatus comprising:
uplink control information (UCI) circuitry to generate uplink control information (UCI) that includes:
periodic channel state information (p-CSI) for a plurality of serving cells;
p-CSI for one or more channel state information (CSI)-processes; or
p-CSI for a single serving cell and hybrid automatic repeat request—acknowledgment (HARQ-ACK) information; and
feedback circuitry coupled with the UCI circuitry, the feedback circuitry to determine an uplink transmit power to transmit the UCI in a subframe with a physical uplink control channel (PUCCH) format that utilizes a quadrature phase shift keying modulation scheme and provides up to 48 bits per subframe,
wherein:
the feedback circuitry is to determine the uplink transmit power based on a CSI offset,
the UCI includes less than 12 bits, and the feedback circuitry is to:
provide single Reed Muller coding; and
determine the uplink transmit power based on $$h(n_{CQI}, n_{HARQ}, n_{SR}) = \frac{n_{HARQ} + (n_{CQI} + \mathrm{sgn}(n_{CQI}) * \alpha) + n_{SR} - 1}{2}$$

where α is the CSI offset, nHARQ is a number of HARQ-ACK bits, nCQI is a number of p-CSI bits, nSR is a scheduling request bit, and $$\mathrm{sgn}(x) = \begin{cases} -1 & \text{if } x < 0, \\ 0 & \text{if } x = 0. \\ 1 & \text{if } x > 0 \end{cases}$$

10. An apparatus comprising:
uplink control information (UCI) circuitry to generate uplink control information (UCI) that includes:
periodic channel state information (p-CSI) for a plurality of serving cells;
p-CSI for one or more channel state information (CSI)-processes; or
p-CSI for a single serving cell and hybrid automatic repeat request—acknowledgment (HARQ-ACK) information; and
feedback circuitry coupled with the UCI circuitry, the feedback circuitry to determine an uplink transmit power to transmit the UCI in a subframe with a physical uplink control channel (PUCCH) format that utilizes a quadrature phase shift keying modulation scheme and provides up to 48 bits per subframe,
wherein:
the feedback circuitry is to determine the uplink transmit power based on a CSI offset,
the UCI includes more than 11 bits, and the feedback circuitry is to:
provide spatial orthogonal transmit diversity or dual Reed Muller coding; and
determine the uplink transmit power based on $$h(n_{CQI}, n_{HARQ}, n_{SR}) = \frac{n_{HARQ} + \tilde{n}_{CQI} + n_{SR} - 1}{3}$$

where α is the CSI offset, $n_{HARQ}$ is a number of HARQ-ACK bits, $n_{CQI}$ is a number of p-CSI bits, $n_{SR}$ is a scheduling request bit, $\tilde{n}_{CQI} = n_{CQI}$ when $n_{HARQ} \neq 0$, and $\tilde{n}_{CQI} = n_{CQI} + \alpha$ when $n_{HARQ} = 0$.

11. An apparatus comprising:
uplink control information (UCI) circuitry to generate uplink control information (UCI) that includes:
periodic channel state information (p-CSI) for a plurality of serving cells;
p-CSI for one or more channel state information (CSI)-processes; or
p-CSI for a single serving cell and hybrid automatic repeat request—acknowledgment (HARQ-ACK) information; and
feedback circuitry coupled with the UCI circuitry, the feedback circuitry to determine an uplink transmit power to transmit the UCI in a subframe with a physical uplink control channel (PUCCH) format that utilizes a quadrature phase shift keying modulation scheme and provides up to 48 bits per subframe,
wherein:
the feedback circuitry is to determine the uplink transmit power based on a CSI offset,
the UCI includes less than 12 bits, and the feedback circuitry is to:
provide single Reed Muller coding; and
determine the uplink transmit power based on $$h(n_{CQI}, n_{HARQ}, n_{SR}) = \frac{n_{HARQ} + \tilde{n}_{CQI} + n_{SR} - 1}{2}$$

where α is the CSI offset, $n_{HARQ}$ is a number of HARQ-ACK bits, $n_{CQI}$ is a number of p-CSI bits, $n_{SR}$ is a scheduling request bit, $\tilde{n}_{CQI} = n_{CQI}$ when $n_{HARQ} \neq 0$, and $\tilde{n}_{CQI} = n_{CQI} + \alpha$ when $n_{HARQ} = 0$.

12. An apparatus comprising:
uplink control information (UCI) circuitry to generate uplink control information (UCI) that includes:
periodic channel state information (p-CSI) for a plurality of serving cells;
p-CSI for one or more channel state information (CSI)-processes; or
p-CSI for a single serving cell and hybrid automatic repeat request—acknowledgment (HARQ-ACK) information; and
feedback circuitry coupled with the UCI circuitry, the feedback circuitry to determine an uplink transmit power to transmit the UCI in a subframe with a physical uplink control channel (PUCCH) format that utilizes a quadrature phase shift keying modulation scheme and provides up to 48 bits per subframe, wherein:
the feedback circuitry is to determine the uplink transmit power based on a CSI offset,
the UCI includes more than 11 bits, and the feedback circuitry is to:
provide spatial orthogonal transmit diversity or dual Reed Muller coding; and
determine the uplink transmit power based on $$h(n_{CQI}, n_{HARQ}, n_{SR}) = \frac{(n_{HARQ} + \beta) + (n_{CQI} + \alpha) + n_{SR} - 1}{3}$$

where $\alpha$ is the CSI offset, $\beta$ is a HARQ offset, $n_{HARQ}$ is a number of HARQ-ACK bits, $n_{CQI}$ is a number of p-CSI bits, and $n_{SR}$ is a scheduling request bit.

13. An apparatus comprising:
uplink control information (UCI) circuitry to generate uplink control information (UCI) that includes:
  periodic channel state information (p-CSI) for a plurality of serving cells;
  p-CSI for one or more channel state information (CSI)-processes; or
  p-CSI for a single serving cell and hybrid automatic repeat request—acknowledgment (HARQ-ACK) information; and
feedback circuitry coupled with the UCI circuitry, the feedback circuitry to determine an uplink transmit power to transmit the UCI in a subframe with a physical uplink control channel (PUCCH) format that utilizes a quadrature phase shift keying modulation scheme and provides up to 48 bits per subframe,
wherein:
the feedback circuitry is to determine the uplink transmit power based on a CSI offset,
the UCI includes less than 12 bits, and the feedback circuitry is to:
provide single Reed Muller coding; and
determine the uplink transmit power based on $$h(n_{CQI}, n_{HARQ}, n_{SR}) = \frac{(n_{HARQ} + \beta) + (n_{CQI} + \alpha) + n_{SR} - 1}{2}$$

where $\alpha$ is the CSI offset, $\beta$ is a HARQ offset, $n_{HARQ}$ is a number of HARQ-ACK bits, $n_{CQI}$ is a number of p-CSI bits, and $n_{SR}$ is a scheduling request bit.

14. One or more non-transitory, computer-readable media having instructions that, when executed, cause a user equipment to comprising:
generate first uplink control information (UCI) that includes periodic channel state information (p-CSI) for a plurality of serving cells, a plurality of channel state information (CSI) processes, or for a single serving cell and hybrid automatic repeat request—acknowledgment (HARQ-ACK) information, and
generate second UCI that includes HARQ-ACK information without p-CSI;
  determine a first uplink transmit power to transmit the first UCI in a subframe with a physical uplink control channel (PUCCH) format 3 based on a CSI parameter, and
  determine a second uplink transmit power to transmit the second UCI based on a HARQ-ACK parameter
  wherein the CSI parameter is a radio resource control (RRC) parameter the provides a delta F offset that is a value provided for PUCCH format 3 and is relative to PUCCH format 1a and the value is selected from a set consisting of −6 decibels (dB), −5 dB, −4 dB, −3 dB, −2 dB, −1 dB, 0 dB, and 1 dB.

15. The one or more non-transitory, computer-readable media of claim 14, wherein the UCI includes more than 11 bits, the CSI parameter is a CSI offset, and instructions, when executed, cause the UE to:
provide spatial orthogonal transmit diversity or dual Reed Muller coding; and
determine the uplink transmit power based on $$h(n_{CQI}, n_{HARQ}, n_{SR}) = \frac{n_{HARQ} + (n_{CQI} + \text{sgn}(n_{CQI}) * \alpha) + n_{SR} - 1}{3}$$

where $\alpha$ is the CSI offset, $n_{HARQ}$ is a number of HARQ-ACK bits, $n_{CQI}$ is a number of p-CSI bits, $n_{SR}$ is a scheduling request bit, and $$\text{sgn}(x) = \begin{cases} -1 & \text{if } x < 0, \\ 0 & \text{if } x = 0. \\ 1 & \text{if } x > 0 \end{cases}$$

16. The one or more non-transitory, computer-readable media of claim 14, wherein the value is −6 decibels (dB), −5 dB, −4 dB, −3 dB, or −2 dB.

17. The one or more non-transitory, computer-readable media of claim 14, wherein the value is −2 decibels (dB), −1 dB, 0 dB, or 1 dB.

18. A user equipment comprising:
the one or more non-transitory computer-readable media of claim 14;
one or more processors coupled with the one or more computer-readable media to execute the instructions; and
a touchscreen user interface.

* * * * *